(12) United States Patent
Garthwaite

(10) Patent No.: US 7,035,884 B2
(45) Date of Patent: Apr. 25, 2006

(54) PLACEMENT OF ALLOCATION TRAINS IN THE TRAIN ALGORITHM

(75) Inventor: Alexander T. Garthwaite, Beverly, MA (US)

(73) Assignee: Sun Microsystems, Inc., Santa Clara, CA (US)

( * ) Notice: Subject to any disclaimer, the term of this patent is extended or adjusted under 35 U.S.C. 154(b) by 454 days.

(21) Appl. No.: 10/288,008

(22) Filed: Nov. 5, 2002

(65) Prior Publication Data

US 2004/0088277 A1    May 6, 2004

(51) Int. Cl.
  *G06F 12/12*    (2006.01)

(52) U.S. Cl. .................................... 707/206

(58) Field of Classification Search ............... 707/206, 707/205, 103 R, 103 X, 103 Y, 102, 103 Z; 718/104, 1; 711/159
See application file for complete search history.

(56) References Cited

U.S. PATENT DOCUMENTS

| | | | | |
|---|---|---|---|---|
| 5,857,210 A | * | 1/1999 | Tremblay et al. | 707/206 |
| 5,873,105 A | * | 2/1999 | Tremblay et al. | 707/206 |
| 6,047,125 A | * | 4/2000 | Agesen et al. | 717/148 |
| 6,148,310 A | * | 11/2000 | Azagury et al. | 707/206 |
| 6,442,661 B1 | * | 8/2002 | Dreszer | 711/170 |
| 6,567,905 B1 | * | 5/2003 | Otis | 711/170 |
| 2002/0095453 A1 | * | 7/2002 | Steensgaard | 709/107 |
| 2002/0133533 A1 | * | 9/2002 | Czajkowski et al. | 709/107 |

OTHER PUBLICATIONS

Jones and Lins, "Garbage Collection: Algorithms for Automatic Dynamic Memory Management," 1996, pp. 165-179, Wiley, New York.
Paul Wilson, "Uniprocessor Garbage Collection Techniques," Technical Report, University of Texas, 1994, 67 pages.
Hudson and Moss, "Incremental Collection of Mature Objects," Proceedings of International Workshop on Memory Management, 1992, Springer-Verlag, 16 pages.

(Continued)

Primary Examiner—Paul L. Rodriguez
Assistant Examiner—Luke Osborne
(74) Attorney, Agent, or Firm—Kudirka & Jobse, LLP

(57) ABSTRACT

A garbage collector collects a dynamically allocated heap by employing the train algorithm, in which "car" sections of a heap generation are organized in groups, or "trains." When a car section comes up for collection, objects that it contains are evacuated if they are referred to by references located in cars not currently being collected. The cars to which they are evacuated belong to the trains that contain the references. The trains form a sequence in which their constituent cars are to be collected, and objects that are directly allocated in the generation are placed into trains that precede some existing train in the collection sequence.

25 Claims, 26 Drawing Sheets

OTHER PUBLICATIONS

Grarup and Seligmann, "Incremental Mature Garbage Collection," M.Sc. Thesis, no date Available at http://www.daimi.au.dk/~jacobse/Papers/.

Seligmann and Grarup, "Incremental Mature Garbage Collection Using the Train Algorithm," Proceedings of ECOOP '95, Ninth European Conference on Object-Oriented Programming, 1995, http://www.daimi.au.dk/~ jacobse/Papers/ 18 pages.

Clark and Mason, "Compacting Garbage Collection can be Fast and Simple," Software-Practice and Experience, Feb. 1996, pp. 177-194, vol. 26, No. 2.

Henry Baker, "List Processing in Real Time on a Serial Computer," Communications of the ACM 21, 4, Apr. 1978, pp. 280-294.

Appel, Ellis, and Li, "Real-time Concurrent Collection on Stock Multiprocessors," ACM SIGPLAN Notices, 1988, 24 pages.

Rodney A. Brooks, "Trading Data Space for Reduced Time and Code Space in Real-Time Garbage Collection on Stock Hardware," Proceedings of the 1984 ACM Symposium on Lisp and Functional Programming, pp. 108-113, Aug. 1984. Austin, Texas.

Herlihy and Moss, "Lock-Free Garbage Collection for Multiprocessors," ACM SPAA, 1991, pp. 229-236.

Bacon, Attanasio, Lee, Rajan, and Smith, "Java without the Coffee Breaks: A Nonintrusive Multiprocessor Garbage Collector," SIGPLAN Conference on Programming Language Design and Implementation, Snowbird, Utah, Jun. 2001, 12 pages.

James Stamos, "Static Grouping of Small Objects to Enhance Performance of a Paged Virtual Memory," ACM Transactions on Computer Systems, vol. 2, No. 2, pp. 155-180, May 1984.

David A. Moon, "Garbage Collection in a Large Lisp System," Conference Record of the 1984 ACM Symposium on LISP and Functional Programming, Austin, Texas, Aug. 1984, pp. 235-246.

Robert Courts, "Improving Locality of Reference in a Garbage-Collecting Memory Management System," Communications of the ACM, Sep. 1988, pp. 1128-1138, vol. 31, No. 9.

Wilson, Lam, and Moher, "Effective Static-Graph Reorganization to Improve Locality in Garbage Collected Systems," Proceedings of ACM SIGPLAN Conference on 15Pages Programming Language Design and Implementation, Jun. 1991, Toronto, Ontario, Canada.

Lam, Wilson, and Moher, "Object Type Directed Garbage Collection to Improve Locality," Proceedings of the International Workshop on Memory Management '92, St. Malo, France, Sep. 1992, pp. 404-425.

Chilimbi and Larus, "Using Generational Garbage Collection to Implement Cache-Conscious Data Placement," International Symposium on Memory Management, Oct. 1998, 12 pages.

Lieberman and Hewitt, "A real-time garbage collector based on the lifetimes of objects," Communications of the ACM, 1983, pp. 419-429, vol. 26, No. 6.

David Ungar, "Generation Scavenging: A Non-Disruptive High Performance Storage Reclamation Algorithm," ACM SIGPLAN Notices, Apr. 1984, pp. 157-167, vol. 19, No. 5.

Andrew W. Appel, "Simple Generational Garbage Collection and Fast Allocation," Software Practice and Experience, 1989, pp. 171-183, vol. 19, No. 2.

Hudson and Diwan, "Adaptive Garbage Collection for Modula-3 and Smalltalk," in OOPSLA/ECOOP Workshop on Garbage Collection in Object-Oriented Systems, Oct. 1990, Edited by Eric Jul and Niels-Cristial Juul. 5 pages.

Hudson and Hosking, "Remembered sets can also play cards," in OOPSLA/ECOOP Workshop on Garbage Collection in Object-Oriented Systems, Oct. 1993, Edited by Moss, Wilson, and Zorn, 8 pages.

Hosking and Moss, "Protection traps and alternatives for memory management of an object-oriented language," ACM Proceedings of the Fourteenth ACM Symposium on Operating Systems Principles, Dec. 1993, pp. 106-119, vol. 27, No. 5.

Hosking, Moss, and Stefanovic, "A Comparative Performance Evaluation of Write Barrier Implementation," in OOPSLA ACM Conference on Object-Oriented Programming, Systems, Languages, and Applications, Oct. 1992, pp. 92-109, vol. 27, No. 10, ACM SIGPLAN Notices, Vancouver, BC, ACM Press.

Patrick G. Sobalvarro, "A Lifetime-based Garbage Collector for LISP Systems on General-Purpose Computers," Massachusetts Institute of Technology, AITR-1417, 1988 ID pages.

* cited by examiner

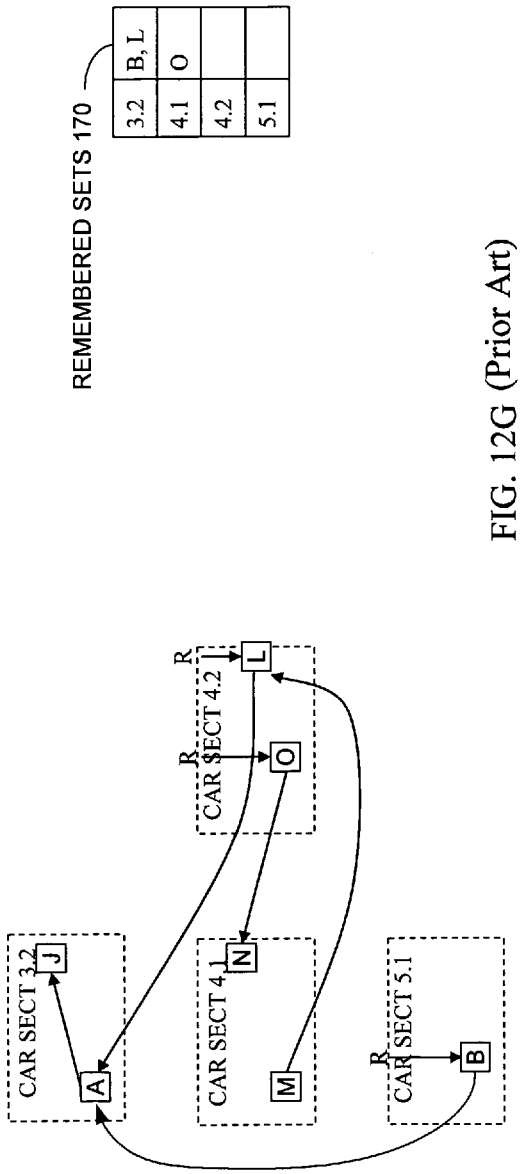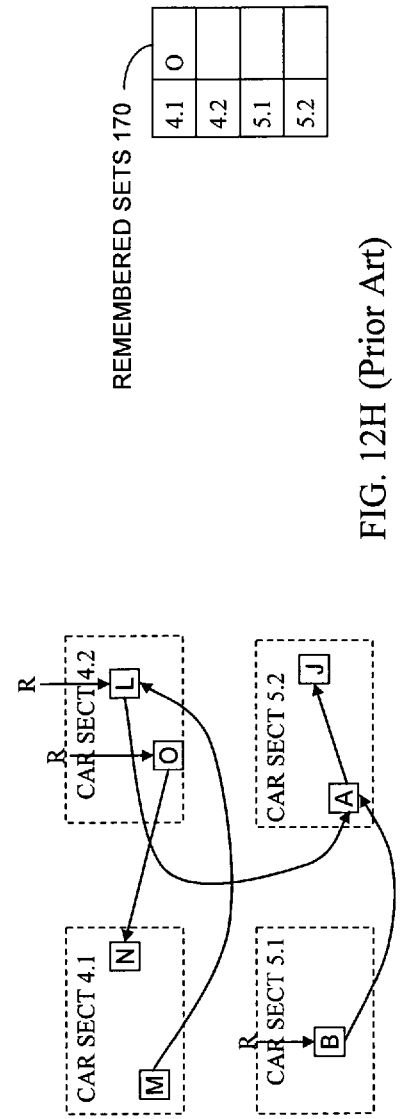
FIG. 12G (Prior Art)
FIG. 12H (Prior Art)

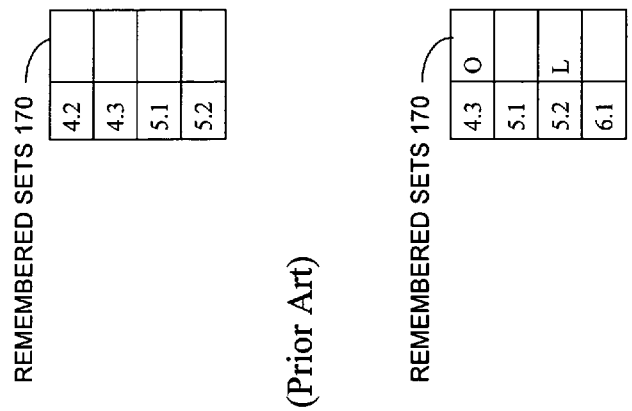
FIG. 12I (Prior Art)
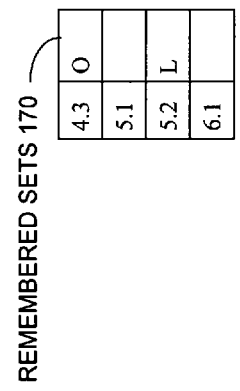
FIG. 12J (Prior Art)
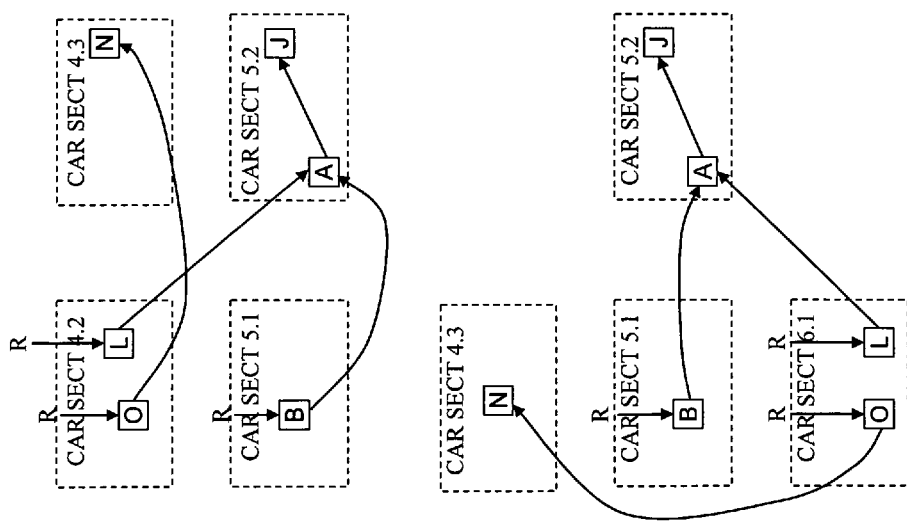

US 7,035,884 B2

PLACEMENT OF ALLOCATION TRAINS IN THE TRAIN ALGORITHM

BACKGROUND OF THE INVENTION

1. Field of the Invention

The present invention is directed to memory management. It particularly concerns what has come to be known as "garbage collection."

2. Background Information

In the field of computer systems, considerable effort has been expended on the task of allocating memory to data objects. For the purposes of this discussion, the term object refers to a data structure represented in a computer system's memory. Other terms sometimes used for the same concept are record and structure. An object may be identified by a reference, a relatively small amount of information that can be used to access the object. A reference can be represented as a "pointer" or a "machine address," which may require, for instance, only sixteen, thirty-two, or sixty-four bits of information, although there are other ways to represent a reference.

In some systems, which are usually known as "object oriented," objects may have associated methods, which are routines that can be invoked by reference to the object. They also may belong to a class, which is an organizational entity that may contain method code or other information shared by all objects belonging to that class. In the discussion that follows, though, the term object will not be limited to such structures; it will additionally include structures with which methods and classes are not associated.

The invention to be described below is applicable to systems that allocate memory to objects dynamically. Not all systems employ dynamic allocation. In some computer languages, source programs must be so written that all objects to which the program's variables refer are bound to storage locations at compile time. This storage-allocation approach, sometimes referred to as "static allocation," is the policy traditionally used by the Fortran programming language, for example.

Even for compilers that are thought of as allocating objects only statically, of course, there is often a certain level of abstraction to this binding of objects to storage locations. Consider the typical computer system 10 depicted in FIG. 1, for example. Data, and instructions for operating on them, that a microprocessor 11 uses may reside in on-board cache memory or be received from further cache memory 12, possibly through the mediation of a cache controller 13. That controller 13 can in turn receive such data from system read/write memory ("RAM") 14 through a RAM controller 15 or from various peripheral devices through a system bus 16. The memory space made available to an application program may be "virtual" in the sense that it may actually be considerably larger than RAM 14 provides. So the RAM contents will be swapped to and from a system disk 17.

Additionally, the actual physical operations performed to access some of the most-recently visited parts of the process's address space often will actually be performed in the cache 12 or in a cache on board microprocessor 11 rather than on the RAM 14, with which those caches swap data and instructions just as RAM 14 and system disk 17 do with each other.

A further level of abstraction results from the fact that an application will often be run as one of many processes operating concurrently with the support of an underlying operating system. As part of that system's memory management, the application's memory space may be moved among different actual physical locations many times in order to allow different processes to employ shared physical memory devices. That is, the location specified in the application's machine code may actually result in different physical locations at different times because the operating system adds different offsets to the machine-language-specified location.

Despite these expedients, the use of static memory allocation in writing certain long-lived applications makes it difficult to restrict storage requirements to the available memory space. Abiding by space limitations is easier when the platform provides for dynamic memory allocation, i.e., when memory space to be allocated to a given object is determined only at run time.

Dynamic allocation has a number of advantages, among which is that the run-time system is able to adapt allocation to run-time conditions. For example, the programmer can specify that space should be allocated for a given object only in response to a particular run-time condition. The C-language library function malloc( ) is often used for this purpose. Conversely, the programmer can specify conditions under which memory previously allocated to a given object can be reclaimed for reuse. The C-language library function free( ) results in such memory reclamation.

Because dynamic allocation provides for memory reuse, it facilitates generation of large or long-lived applications, which over the course of their lifetimes may employ objects whose total memory requirements would greatly exceed the available memory resources if they were bound to memory locations statically.

Particularly for long-lived applications, though, allocation and reclamation of dynamic memory must be performed carefully. If the application fails to reclaim unused memory—or, worse, loses track of the address of a dynamically allocated segment of memory—its memory requirements will grow over time to exceed the system's available memory. This kind of error is known as a "memory leak."

Another kind of error occurs when an application reclaims memory for reuse even though it still maintains a reference to that memory. If the reclaimed memory is reallocated for a different purpose, the application may inadvertently manipulate the same memory in multiple inconsistent ways. This kind of error is known as a "dangling reference," because an application should not retain a reference to a memory location once that location is reclaimed. Explicit dynamic-memory management by using interfaces like malloc( )/free( ) often leads to these problems.

A way of reducing the likelihood of such leaks and related errors is to provide memory-space reclamation in a more-automatic manner. Techniques used by systems that reclaim memory space automatically are commonly referred to as "garbage collection." Garbage collectors operate by reclaiming space that they no longer consider "reachable." Statically allocated objects represented by a program's global variables are normally considered reachable throughout a program's life. Such objects are not ordinarily stored in the garbage collector's managed memory space, but they may contain references to dynamically allocated objects that are, and such objects are considered reachable. Clearly, an object referred to in the processor's call stack is reachable, as is an object referred to by register contents. And an object referred to by any reachable object is also reachable.

The use of garbage collectors is advantageous because, whereas a programmer working on a particular sequence of code can perform his task creditably in most respects with only local knowledge of the application at any given time, memory allocation and reclamation require a global knowledge of the program. Specifically, a programmer dealing with a given sequence of code does tend to know whether some portion of memory is still in use for that sequence of code, but it is considerably more difficult for him to know what the rest of the application is doing with that memory. By tracing references from some conservative notion of a "root set," e.g., global variables, registers, and the call stack, automatic garbage collectors obtain global knowledge in a methodical way. By using a garbage collector, the programmer is relieved of the need to worry about the application's global state and can concentrate on local-state issues, which are more manageable. The result is applications that are more robust, having no dangling references and fewer memory leaks.

Garbage-collection mechanisms can be implemented by various parts and levels of a computing system. One approach is simply to provide them as part of a batch compiler's output. Consider FIG. 2's simple batch-compiler operation, for example. A computer system executes in accordance with compiler object code and therefore acts as a compiler 20. The compiler object code is typically stored on a medium such as FIG. 1's system disk 17 or some other machine-readable medium, and it is loaded into RAM 14 to configure the computer system to act as a compiler. In some cases, though, the compiler object code's persistent storage may instead be provided in a server system remote from the machine that performs the compiling. The electrical signals that carry the digital data by which the computer systems exchange that code are examples of the kinds of electromagnetic signals by which the computer instructions can be communicated. Others are radio waves, microwaves, and both visible and invisible light.

The input to the compiler is the application source code, and the end product of the compiler process is application object code. This object code defines an application 21, which typically operates on input such as mouse clicks, etc., to generate a display or some other type of output. This object code implements the relationship that the programmer intends to specify by his application source code. In one approach to garbage collection, the compiler 20, without the programmer's explicit direction, additionally generates code that automatically reclaims unreachable memory space.

Even in this simple case, though, there is a sense in which the application does not itself provide the entire garbage collector. Specifically, the application will typically call upon the underlying operating system's memory-allocation functions. And the operating system may in turn take advantage of various hardware that lends itself particularly to use in garbage collection. So even a very simple system may disperse the garbage-collection mechanism over a number of computer-system layers.

To get some sense of the variety of system components that can be used to implement garbage collection, consider FIG. 3's example of a more complex way in which various levels of source code can result in the machine instructions that a processor executes. In the FIG. 3 arrangement, the human applications programmer produces source code 22 written in a high-level language. A compiler 23 typically converts that code into "class files." These files include routines written in instructions, called "byte codes" 24, for a "virtual machine" that various processors can be software-configured to emulate. This conversion into byte codes is almost always separated in time from those codes' execution, so FIG. 3 divides the sequence into a "compile-time environment" 25 separate from a "run-time environment" 26, in which execution occurs. One example of a high-level language for which compilers are available to produce such virtual-machine instructions is the Java™ programming language. (Java is a trademark or registered trademark of Sun Microsystems, Inc., in the United States and other countries.)

Most typically, the class files' byte-code routines are executed by a processor under control of a virtual-machine process 27. That process emulates a virtual machine from whose instruction set the byte codes are drawn. As is true of the compiler 23, the virtual-machine process 27 may be specified by code stored on a local disk or some other machine-readable medium from which it is read into FIG. 1's RAM 14 to configure the computer system to implement the garbage collector and otherwise act as a virtual machine. Again, though, that code's persistent storage may instead be provided by a server system remote from the processor that implements the virtual machine, in which case the code would be transmitted electrically or optically to the virtual-machine-implementing processor.

In some implementations, much of the virtual machine's action in executing these byte codes is most like what those skilled in the art refer to as "interpreting," so FIG. 3 depicts the virtual machine as including an "interpreter" 28 for that purpose. In addition to or instead of running an interpreter, many virtual-machine implementations actually compile the byte codes concurrently with the resultant object code's execution, so FIG. 3 depicts the virtual machine as additionally including a "just-in-time" compiler 29. The arrangement of FIG. 3 differs from FIG. 2 in that the compiler 23 for converting the human programmer's code does not contribute to providing the garbage-collection function; that results largely from the virtual machine 27's operation.

Those skilled in that art will recognize that both of these organizations are merely exemplary, and many modern systems employ hybrid mechanisms, which partake of the characteristics of traditional compilers and traditional interpreters both. The invention to be described below is applicable independently of whether a batch compiler, a just-in-time compiler, an interpreter, or some hybrid is employed to process source code. In the remainder of this application, therefore, we will use the term compiler to refer to any such mechanism, even if it is what would more typically be called an interpreter.

The arrangement of FIG. 3 differs from FIG. 2 in that the compiler 23 for converting the human programmer's code does not contribute to providing the garbage-collection function; that results largely from the virtual machine 27's operation. Although the FIG. 3 arrangement is a popular one, it is by no means universal, and many further implementation types can be expected. Proposals have even been made to implement the virtual machine 27's behavior in a hardware processor, in which case the hardware itself would provide some or all of the garbage-collection function.

In short, garbage collectors can be implemented in a wide range of combinations of hardware and/or software. As is true of most of the garbage-collection techniques described in the literature, the invention to be described below is applicable to most such systems.

By implementing garbage collection, a computer system can greatly reduce the occurrence of memory leaks and other software deficiencies in which human programming frequently results. But it can also have significant adverse performance effects if it is not implemented carefully. To distinguish the part of the program that does "useful" work from that which does the garbage collection, the term mutator is sometimes used in discussions of these effects; from the collector's point of view, what the mutator does is mutate active data structures' connectivity.

Some garbage-collection approaches rely heavily on interleaving garbage-collection steps among mutator steps. In one type of garbage-collection approach, for instance, the mutator operation of writing a reference is followed immediately by garbage-collector steps used to maintain a reference count in that object's header, and code for subsequent new-object storage includes steps for finding space occupied by objects whose reference count has fallen to zero. Obviously, such an approach can slow mutator operation significantly.

Other approaches therefore interleave very few garbage-collector-related instructions into the main mutator process but instead interrupt it from time to time to perform garbage-collection cycles, in which the garbage collector finds unreachable objects and reclaims their memory space for reuse. Such an approach will be assumed in discussing FIG. 4's depiction of a simple garbage-collection operation. Within the memory space allocated to a given application is a part 40 managed by automatic garbage collection. In the following discussion, this will be referred to as the "heap," although in other contexts that term refers to all dynamically allocated memory. During the course of the application's execution, space is allocated for various objects 42, 44, 46, 48, and 50. Typically, the mutator allocates space within the heap by invoking the garbage collector, which at some level manages access to the heap. Basically, the mutator asks the garbage collector for a pointer to a heap region where it can safely place the object's data. The garbage collector keeps track of the fact that the thus-allocated region is occupied. It will refrain from allocating that region in response to any other request until it determines that the mutator no longer needs the region allocated to that object.

Garbage collectors vary as to which objects they consider reachable and unreachable. For the present discussion, though, an object will be considered "reachable" if it is referred to, as object 42 is, by a reference in the root set 52. The root set consists of reference values stored in the mutator's threads' call stacks, the CPU registers, and global variables outside the garbage-collected heap. An object is also reachable if it is referred to, as object 46 is, by another reachable object (in this case, object 42). Objects that are not reachable can no longer affect the program, so it is safe to re-allocate the memory spaces that they occupy.

A typical approach to garbage collection is therefore to identify all reachable objects and reclaim any previously allocated memory that the reachable objects do not occupy. A typical garbage collector may identify reachable objects by tracing references from the root set 52. For the sake of simplicity, FIG. 4 depicts only one reference from the root set 52 into the heap 40. (Those skilled in the art will recognize that there are many ways to identify references, or at least data contents that may be references.) The collector notes that the root set points to object 42, which is therefore reachable, and that reachable object 42 points to object 46, which therefore is also reachable. But those reachable objects point to no other objects, so objects 44, 48, and 50 are all unreachable, and their memory space may be reclaimed. This may involve, say, placing that memory space in a list of free memory blocks.

To avoid excessive heap fragmentation, some garbage collectors additionally relocate reachable objects. FIG. 5 shows a typical approach. The heap is partitioned into two halves, hereafter called "semi-spaces." For one garbage-collection cycle, all objects are allocated in one semi-space 54, leaving the other semi-space 56 free. When the garbage-collection cycle occurs, objects identified as reachable are "evacuated" to the other semi-space 56, so all of semi-space 54 is then considered free. Once the garbage-collection cycle has occurred, all new objects are allocated in the lower semi-space 56 until yet another garbage-collection cycle occurs, at which time the reachable objects are evacuated back to the upper semi-space 54.

Although this relocation requires the extra steps of copying the reachable objects and updating references to them, it tends to be quite efficient, since most new objects quickly become unreachable, so most of the current semi-space is actually garbage. That is, only a relatively few, reachable objects need to be relocated, after which the entire semi-space contains only garbage and can be pronounced free for reallocation.

Now, a collection cycle can involve following all reference chains from the basic root set—i.e., from inherently reachable locations such as the call stacks, class statics and is other global variables, and registers—and reclaiming all space occupied by objects not encountered in the process. And the simplest way of performing such a cycle is to interrupt the mutator to provide a collector interval in which the entire cycle is performed before the mutator resumes. For certain types of applications, this approach to collection-cycle scheduling is acceptable and, in fact, highly efficient.

For many interactive and real-time applications, though, this approach is not acceptable. The delay in mutator operation that the collection cycle's execution causes can be annoying to a user and can prevent a real-time application from responding to its environment with the required speed. In some applications, choosing collection times opportunistically can reduce this effect. Collection intervals can be inserted when an interactive mutator reaches a point at which it awaits user input, for instance.

So it may often be true that the garbage-collection operation's effect on performance can depend less on the total collection time than on when collections actually occur. But another factor that often is even more determinative is the duration of any single collection interval, i.e., how long the mutator must remain quiescent at any one time. In an interactive system, for instance, a user may never notice hundred-millisecond interruptions for garbage collection, whereas most users would find interruptions lasting for two seconds to be annoying.

The cycle may therefore be divided up among a plurality of collector intervals. When a collection cycle is divided up among a plurality of collection intervals, it is only after a number of intervals that the collector will have followed all reference chains and be able to identify as garbage any objects not thereby reached. This approach is more complex than completing the cycle in a single collection interval; the mutator will usually modify references between collection intervals, so the collector must repeatedly update its view of the reference graph in the midst of the collection cycle. To make such updates practical, the mutator must communicate with the collector to let it know what reference changes are made between intervals.

An even more complex approach, which some systems use to eliminate discrete pauses or maximize resource-use efficiency, is to execute the mutator and collector in concurrent execution threads. Most systems that use this approach use it for most but not all of the collection cycle; the mutator is usually interrupted for a short collector interval, in which a part of the collector cycle takes place without mutation.

Independent of whether the collection cycle is performed concurrently with mutator operation, is completed in a single interval, or extends over multiple intervals is the question of whether the cycle is complete, as has tacitly been assumed so far, or is instead "incremental." In incremental collection, a collection cycle constitutes only an increment of collection: the collector does not follow all reference chains from the basic root set completely. Instead, it concentrates on only a portion, or collection set, of the heap. Specifically, it identifies every collection-set object referred to by a reference chain that extends into the collection set from outside of it, and it reclaims the collection-set space not occupied by such objects, possibly after evacuating them from the collection set.

By thus culling objects referenced by reference chains that do not necessarily originate in the basic root set, the collector can be thought of as expanding the root set to include as roots some locations that may not be reachable. Although incremental collection thereby leaves "floating garbage," it can result in relatively low pause times even if entire collection increments are completed during respective single collection intervals.

Most collectors that employ incremental collection operate in "generations" although this is not necessary in principle. Different portions, or generations, of the heap are subject to different collection policies. New objects are allocated in a "young" generation, and older objects are promoted from younger generations to older or more "mature" generations. Collecting the younger generations more frequently than the others yields greater efficiency because the younger generations tend to accumulate garbage faster; newly allocated objects tend to "die," while older objects tend to "survive."

But generational collection greatly increases what is effectively the root set for a given generation. Consider FIG. 6, which depicts a heap as organized into three generations 58, 60, and 62. Assume that generation 60 is to be collected. The process for this individual generation may be more or less the same as that described in connection with FIGS. 4 and 5 for the entire heap, with one major exception. In the case of a single generation, the root set must be considered to include not only the call stack, registers, and global variables represented by set 52 but also objects in the other generations 58 and 62, which themselves may contain references to objects in generation 60. So pointers must be traced not only from the basic root set 52 but also from objects within the other generations.

One could perform this tracing by simply inspecting all references in all other generations at the beginning of every collection interval, and it turns out that this approach is actually feasible in some situations. But it takes too long in other situations, so workers in this field have employed a number of approaches to expediting reference tracing. One approach is to include so-called write barriers in the mutator process. A write barrier is code added to a write operation to record information from which the collector can determine where references were written or may have been since the last collection interval. A reference list can then be maintained by taking such a list as it existed at the end of the previous collection interval and updating it by inspecting only locations identified by the write barrier as possibly modified since the last collection interval.

One of the many write-barrier implementations commonly used by workers in this art employs what has been referred to as the "card table." FIG. 6 depicts the various generations as being divided into smaller sections, known for this purpose as "cards." Card tables 64, 66, and 68 associated with respective generations contain an entry for each of their cards. When the mutator writes a reference in a card, it makes an appropriate entry in the card-table location associated with that card (or, say, with the card in which the object containing the reference begins). Most write-barrier implementations simply make a Boolean entry indicating that the write operation has been performed, although some may be more elaborate. The mutator having thus left a record of where new or modified references may be, the collector can thereafter prepare appropriate summaries of that information, as will be explained in due course. For the sake of concreteness, we will assume that the summaries are maintained by steps that occur principally at the beginning of each collection interval.

Of course, there are other write-barrier approaches, such as simply having the write barrier add to a list of addresses where references where written. Also, although there is no reason in principle to favor any particular number of generations, and although FIG. 6 shows three, most generational garbage collectors have only two generations, of which one is the young generation and the other is the mature generation. Moreover, although FIG. 6 shows the generations as being of the same size, a more-typical configuration is for the young generation to be considerably smaller. Finally, although we assumed for the sake of simplicity that collection during a given interval was limited to only one generation, a more-typical approach is actually to collect the whole young generation at every interval but to collect the mature one less frequently.

Some collectors collect the entire young generation in every interval and may thereafter perform mature-generation collection in the same interval. It may therefore take relatively little time to scan all young-generation objects remaining after young-generation collection to find references into the mature generation. Even when such collectors do use card tables, therefore, they often do not use them for finding young-generation references that refer to mature-generation objects. On the other hand, laboriously scanning the entire mature generation for references to young-generation (or mature-generation) objects would ordinarily take too long, so the collector uses the card table to limit the amount of memory it searches for mature-generation references.

Now, although it typically takes very little time to collect the young generation, it may take more time than is acceptable within a single garbage-collection interval to collect the entire mature generation. So some garbage collectors may collect the mature generation incrementally; that is, they may perform only a part of the mature generation's collection during any particular collection cycle. Incremental collection presents the problem that, since the generation's unreachable objects outside the "collection set" of objects processed during that cycle cannot be recognized as unreachable, collection-set objects to which they refer tend not to be, either.

To reduce the adverse effect this would otherwise have on collection efficiency, workers in this field have employed the "train algorithm," which FIG. 7 depicts. A generation to be collected incrementally is divided into sections, which for reasons about to be described are referred to as "car sections." Conventionally, a generation's incremental collection occurs in fixed-size sections, and a car section's size is that of the generation portion to be collected during one cycle.

The discussion that follows will occasionally employ the nomenclature in the literature by using the term car instead of car section. But the literature seems to use that term to refer variously not only to memory sections themselves but also to data structures that the train algorithm employs to manage them when they contain objects, as well as to the more-abstract concept that the car section and managing data structure represent in discussions of the algorithm. So the following discussion will more frequently use the expression car section to emphasize the actual sections of memory space for whose management the car concept is employed.

According to the train algorithm, the car sections are grouped into "trains," which are ordered, conventionally according to age. For example, FIG. 7 shows an oldest train 73 consisting of a generation 74's three car sections described by associated data structures 75, 76, and 78, while a second train 80 consists only of a single car section, represented by structure 82, and the youngest train 84 (referred to as the "allocation train") consists of car sections that data structures 86 and 88 represent. As will be seen below, car sections' train memberships can change, and any car section added to a train is typically added to the end of a train.

Conventionally, the car collected in an increment is the one added earliest to the oldest train, which in this case is car 75. All of the generation's cars can thus be thought of as waiting for collection in a single long line, in which cars are ordered in accordance with the order of the trains to which they belong and, within trains, in accordance with the order in which they were added to those trains.

As is usual, the way in which reachable objects are identified is to determine whether there are references to them in the root set or in any other object already determined to be reachable. In accordance with the train algorithm, the collector additionally performs a test to determine whether there are any references at all from outside the oldest train to objects within it. If there are not, then all cars within the train can be reclaimed, even though not all of those cars are in the collection set. And the train algorithm so operates that inter-car references tend to be grouped into trains, as will now be explained.

To identify references into the car from outside of it, train-algorithm implementations typically employ "remembered sets." As card tables are, remembered sets are used to keep track of references. Whereas a card-table entry contains information about references that the associated card contains, though, a remembered set associated with a given region contains information about references into that region from locations outside of it. In the case of the train algorithm, remembered sets are associated with car sections. Each remembered set, such as car 75's remembered set 90, lists locations in the generation that contain references into the associated car section.

The remembered sets for all of a generation's cars are typically updated at the start of each collection interval. To illustrate how such updating and other collection operations may be carried out, FIG. 8 depicts an operational sequence in a system of the typical type mentioned above. That is, it shows a sequence of operations that may occur in a system in which the entire garbage-collected heap is divided into two generations, namely, a young generation and an old generation, and in which the young generation is much smaller than the old generation. FIG. 8 is also based on the assumption and that the train algorithm is used only for collecting the old generation.

Block 102 represents a period of the mutator's operation. As was explained above, the mutator makes a card-table entry to identify any card that it has "dirtied" by adding or modifying a reference that the card contains. At some point, the mutator will be interrupted for collector operation. Different implementations employ different events to trigger such an interruption, but we will assume for the sake of concreteness that the system's dynamic-allocation routine causes such interruptions when no room is left in the young generation for any further allocation. A dashed line 103 represents the transition from mutator operation and collector operation.

In the system assumed for the FIG. 8 example, the collector collects the (entire) young generation each time such an interruption occurs. When the young generation's collection ends, the mutator operation usually resumes, without the collector's having collected any part of the old generation. Once in a while, though, the collector also collects part of the old generation, and FIG. 8 is intended to illustrate such an occasion.

When the collector's interval first starts, it first processes the card table, in an operation that block 104 represents. As was mentioned above, the collector scans the "dirtied" cards for references into the young generation. If a reference is found, that fact is memorialized appropriately. If the reference refers to a young-generation object, for example, an expanded card table may be used for this purpose. For each card, such an expanded card table might include a multi-byte array used to summarize the card's reference contents. The summary may, for instance, be a list of offsets that indicate the exact locations within the card of references to young-generation objects, or it may be a list of fine-granularity "sub-cards" within which references to young-generation objects may be found. If the reference refers to an old-generation object, the collector often adds an entry to the remembered set associated with the car containing that old-generation object. The entry identifies the reference's location, or at least a small region in which the reference can be found. For reasons that will become apparent, though, the collector will typically not bother to place in the remembered set the locations of references from objects in car sections farther forward in the collection queue than the referred-to object, i.e., from objects in older trains or in cars added earlier to the same train.

The collector then collects the young generation, as block 105 indicates. (Actually, young-generation collection may be interleaved with the dirty-region scanning, but the drawing illustrates it for purpose of explanation as being separate.) If a young-generation object is referred to by a reference that card-table scanning has revealed, that object is considered to be potentially reachable, as is any young-generation object referred to by a reference in the root set or in another reachable young-generation object. The space occupied by any young-generation object thus considered reachable is withheld from reclamation. For example, it may be evacuated to a young-generation semi-space that will be used for allocation during the next mutator interval. It may instead be promoted into the older generation, where it is placed into a car containing a reference to it or into a car in the last train. Or some other technique may be used to keep the memory space it occupies off the system's free list. The collector then reclaims any young-generation space occupied by any other objects, i.e., by any young-generation objects not identified as transitively reachable through references located outside the young generation.

The collector then performs the train algorithm's central test, referred to above, of determining whether there are any references into the oldest train from outside of it. As was mentioned above, the actual process of determining, for each object, whether it can be identified as unreachable is performed for only a single car section in any cycle. In the absence of features such as those provided by the train algorithm, this would present a problem, because garbage structures may be larger than a car section. Objects in such structures would therefore (erroneously) appear reachable, since they are referred to from outside the car section under consideration. But the train algorithm additionally keeps track of whether there are any references into a given car from outside the train to which it belongs, and trains' sizes are not limited. As will be apparent presently, objects not found to be unreachable are relocated in such a way that garbage structures tend to be gathered into respective trains into which, eventually, no references from outside the train point. If no references from outside the train point to any objects inside the train, the train can be recognized as containing only garbage. This is the test that block 106 represents. All cars in a train thus identified as containing only garbage can be reclaimed.

The question of whether old-generation references point into the train from outside of it is (conservatively) answered in the course of updating remembered sets; in the course of updating a car's remembered set, it is a simple matter to flag the car as being referred to from outside the train. The step-106 test additionally involves determining whether any references from outside the old generation point into the oldest train. Various approaches to making this determination have been suggested, including the conceptually simple approach of merely following all reference chains from the root set until those chains (1) terminate, (2) reach an old-generation object outside the oldest train, or (3) reach an object in the oldest train. In the two-generation example, most of this work can be done readily by identifying references into the collection set from live young-generation objects during the young-generation collection. If one or more such chains reach the oldest train, that train includes reachable objects. It may also include reachable objects if the remembered-set-update operation has found one or more references into the oldest train from outside of it. Otherwise, that train contains only garbage, and the collector reclaims all of its car sections for reuse, as block 107 indicates. The collector may then return control to the mutator, which resumes execution, as FIG. 8B's block 108 indicates.

If the train contains reachable objects, on the other hand, the collector turns to evacuating potentially reachable objects from the collection set. The first operation, which block 110 represents, is to remove from the collection set any object that is reachable from the root set by way of a reference chain that does not pass through the part of the old generation that is outside of the collection set. In the illustrated arrangement, in which there are only two generations, and the young generation has previously been completely collected during the same interval, this means evacuating from a collection set any object that (1) is directly referred to by a reference in the root set, (2) is directly referred to by a reference in the young generation (in which no remaining objects have been found unreachable), or (3) is referred to by any reference in an object thereby evacuated. All of the objects thus evacuated are placed in cars in the youngest train, which was newly created during the collection cycle. Certain of the mechanics involved in the evacuation process are described in more detail in connection with similar evacuation performed, as blocks 112 and 114 indicate, in response to remembered-set entries.

FIG. 9 illustrates how the processing represented by block 114 proceeds. The entries identify heap regions, and, as block 116 indicates, the collector scans the thus-identified heap regions to find references to locations in the collection-set. As blocks 118 and 120 indicate, that entry's processing continues until the collector finds no more such references. Every time the collector does find such a reference, it checks to determine whether, as a result of a previous entry's processing, the referred-to object has already been evacuated. If it has not, the collector evacuates the referred-to object to a (possibly new) car in the train containing the reference, as blocks 122 and 124 indicate.

As FIG. 10 indicates, the evacuation operation includes more than just object relocation, which block 126 represents. Once the object has been moved, the collector places a forwarding pointer in the collection-set location from which it was evacuated, for a purpose that will become apparent presently. Block 128 represents that step. (Actually, there are some cases in which the evacuation is only a "logical" evacuation: the car containing the object is simply re-linked to a different logical place in the collection sequence, but its address does not change. In such cases, forwarding pointers are unnecessary.) Additionally, the reference in response to which the object was evacuated is updated to point to the evacuated object's new location, as block 130 indicates. And, as block 132 indicates, any reference contained in the evacuated object is processed, in an operation that FIGS. 11A and 11B (together, "FIG. 11") depict.

For each one of the evacuated object's references, the collector checks to see whether the location that it refers to is in the collection set. As blocks 134 and 136 indicate, the reference processing continues until all references in the evacuated object have been processed. In the meantime, if a reference refers to a collection-set location that contains an object not yet evacuated, the collector evacuates the referred-to object to the train to which the evacuated object containing the reference was evacuated, as blocks 138 and 140 indicate. If the reference refers to a location in the collection set from which the object has already been evacuated, then the collector uses the forwarding pointer left in that location to update the reference, as block 142 indicates. Before the processing of FIG. 11, the remembered set of the referred-to object's car will have an entry that identifies the evacuated object's old location as one containing a reference to the referred-to object. But the evacuation has placed the reference in a new location, for which the remembered set of the referred-to object's car may not have an entry. So, if that new location is not as far forward as the referred-to object, the collector adds to that remembered set an entry identifying the reference's new region, as blocks 144 and 146 indicate. As the drawings show, the same type of remembered-set update is performed if the object referred to by the evacuated reference is not in the collection set.

Now, some train-algorithm implementations postpone processing of the references contained in evacuated collection-set objects until after all directly reachable collection-set objects have been evacuated. In the implementation that FIG. 10 illustrates, though, the processing of a given evacuated object's references occurs before the next object is evacuated. So FIG. 11's blocks 134 and 148 indicate that the FIG. 11 operation is completed when all of the references contained in the evacuated object have been processed. This completes FIG. 10's object-evacuation operation, which FIG. 9's block 124 represents.

As FIG. 9 indicates, each collection-set object referred to by a reference in a remembered-set-entry-identified location is thus evacuated if it has not been already. If the object has already been evacuated from the referred-to location, the reference to that location is updated to point to the location to which the object has been evacuated. If the remembered set associated with the car containing the evacuated object's new location does not include an entry for the reference's location, it is updated to do so if the car containing the reference is younger than the car containing the evacuated object. Block 150 represents updating the reference and, if necessary, the remembered set.

As FIG. 8's blocks 112 and 114 indicate, this processing of collection-set remembered sets is performed initially only for entries that do not refer to locations in the oldest train. Those that do are processed only after all others have been, as blocks 152 and 154 indicate.

When this process has been completed, the collection set's memory space can be reclaimed, as block 164 indicates, since no remaining object is referred to from outside the collection set: any remaining collection-set object is unreachable. The collector then relinquishes control to the mutator.

FIGS. 12A–12J illustrate results of using the train algorithm. FIG. 12A represents a generation in which objects have been allocated in nine car sections. The oldest train has four cars, numbered 1.1 through 1.4. Car 1.1 has two objects, A and B. There is a reference to object B in the root set (which, as was explained above, includes live objects in the other generations). Object A is referred to by object L, which is in the third train's sole car section. In the generation's remembered sets 170, a reference in object L has therefore been recorded against car 1.1.

Processing always starts with the oldest train's earliest-added car, so the garbage collector refers to car 1.1's remembered set and finds that there is a reference from object L into the car being processed. It accordingly evacuates object A to the train that object L occupies. The object being evacuated is often placed in one of the selected train's existing cars, but we will assume for present purposes that there is not enough room. So the garbage collector evacuates object A into a new car section and updates appropriate data structures to identify it as the next car in the third train. FIG. 12B depicts the result: a new car has been added to the third train, and object A is placed in it.

FIG. 12B also shows that object B has been evacuated to a new car outside the first train. This is because object B has an external reference, which, like the reference to object A, is a reference from outside the first train, and one goal of the processing is to form trains into which there are no further references. Note that, to maintain a reference to the same object, object L's reference to object A has had to be rewritten, and so have object B's reference to object A and the inter-generational pointer to object B. In the illustrated example, the garbage collector begins a new train for the car into which object B is evacuated, but this is not a necessary requirement of the train algorithm. That algorithm requires only that externally referenced objects be evacuated to a newer train.

Since car 1.1 no longer contains live objects, it can be reclaimed, as FIG. 12B also indicates. Also note that the remembered set for car 2.1 now includes the address of a reference in object A, whereas it did not before. As was stated before, remembered sets in the illustrated embodiment include only references from cars further back in the order than the one with which the remembered set is associated. The reason for this is that any other cars will already be reclaimed by the time the car associated with that remembered set is processed, so there is no reason to keep track of references from them.

The next step is to process the next car, the one whose index is 1.2. Conventionally, this would not occur until some collection cycle after the one during which car 1.1 is collected. For the sake of simplicity we will assume that the mutator has not changed any references into the generation in the interim.

FIG. 12B depicts car 1.2 as containing only a single object, object C, and that car's remembered set contains the address of an inter-car reference from object F. The garbage collector follows that reference to object C. Since this identifies object C as possibly reachable, the garbage collector evacuates it from car set 1.2, which is to be reclaimed. Specifically, the garbage collector removes object C to a new car section, section 1.5, 20 which is linked to the train to which the referring object F's car belongs. Of course, object F's reference needs to be updated to object C's new location. FIG. 12C depicts the evacuation's result.

FIG. 12C also indicates that car set 1.2 has been reclaimed, and car 1.3 is next to be processed. The only address in car 1.3's remembered set is that of a reference in object G. Inspection of that reference reveals that it refers to object F. Object F may therefore be reachable, so it must be evacuated before car section 1.3 is reclaimed. On the other hand, there are no references to objects D and E, so they are clearly garbage. FIG. 12D depicts the result of reclaiming car 1.3's space after evacuating possibly reachable object F.

In the state that FIG. 12D depicts, car 1.4 is next to be processed, and its remembered set contains the addresses of references in objects K and C. Inspection of object K's reference reveals that it refers to object H, so object H must be evacuated. Inspection of the other remembered-set entry, the reference in object C, reveals that it refers to object G, so that object is evacuated, too. As FIG. 12E illustrates, object H must be added to the second train, to which its referring object K belongs. In this case there is room enough in car 2.2, which its referring object K occupies, so evacuation of object H does not require that object K's reference to object H be added to car 2.2's remembered set. Object G is evacuated to a new car in the same train, since that train is where referring object C resides. And the address of the reference in object G to object C is added to car 1.5's remembered set.

FIG. 12E shows that this processing has eliminated all references into the first train, and it is an important part of the train algorithm to test for this condition. That is, even though there are references into both of the train's cars, those cars' contents can be recognized as all garbage because there are no references into the train from outside of it. So all of the first train's cars are reclaimed.

The collector accordingly processes car 2.1 during the next collection cycle, and that car's remembered set indicates that there are two references outside the car that refer to objects within it. Those references are in object K, which is in the same train, and object A, which is not. Inspection of those references reveals that they refer to objects I and J, which are evacuated.

The result, depicted in FIG. 12F, is that the remembered sets for the cars in the second train reveal no inter-car references, and there are no inter-generational references into it, either. That train's car sections therefore contain only garbage, and their memory space can be reclaimed.

So car 3.1 is processed next. Its sole object, object L, is referred to inter-generationally as well as by a reference in the fourth train's object M. As FIG. 12G shows, object L is therefore evacuated to the fourth train. And the address of the reference in object L to object A is placed in the remembered set associated with car 3.2, in which object A resides.

The next car to be processed is car 3.2, whose remembered set includes the addresses of references into it from objects B and L. Inspection of the reference from object B reveals that it refers to object A, which must therefore be evacuated to the fifth train before car 3.2 can be reclaimed.

Also, we assume that object A cannot fit in car section 5.1, so a new car 5.2 is added to that train, as FIG. 12H shows, and object A is placed in its car section. All referred-to objects in the third train having been evacuated, that (single-car) train can be reclaimed in its entirety.

A further observation needs to be made before we leave FIG. 12G. Car 3.2's remembered set additionally lists a reference in object L, so the garbage collector inspects that reference and finds that it points to the location previously occupied by object A. This brings up a feature of copying-collection techniques such as the typical train-algorithm implementation. When the garbage collector evacuates an object from a car section, it marks the location as having been evacuated and leaves the address of the object's new location. So, when the garbage collector traces the reference from object L, it finds that object A has been removed, and it accordingly copies the new location into object L as the new value of its reference to object A.

In the state that FIG. 12H illustrates, car 4.1 is the next to be processed. Inspection of the fourth train's remembered sets reveals no inter-train references into it, but the inter-generational scan (possibly performed with the aid of FIG. 6's card tables) reveals inter-generational references into car 4.2. So the fourth train cannot be reclaimed yet. The garbage collector accordingly evacuates car 4.1's referred-to objects in the normal manner, with the result that FIG. 12I depicts.

In that state, the next car to be processed has only inter-generational references into it. So, although its referred-to objects must therefore be evacuated from the train, they cannot be placed into trains that contain references to them. Conventionally, such objects are evacuated to a train at the end of the train sequence. In the illustrated implementation, a new train is formed for this purpose, so the result of car 4.2's processing is the state that FIG. 12J depicts.

Processing continues in this same fashion. Of course, subsequent collection cycles will not in general proceed, as in the illustrated cycles, without any reference changes by the mutator and without any addition of further objects. As was mentioned above in connection with FIG. 8A's block 105, increments of old-generation collection are usually preceded by a younger generation's collection, and at least some survivors of that young-generation collection process are usually promoted into the mature generation. Additionally, some objects may be allocated directly into the train-algorithm-managed generation, without initially placing them in the young generation. For example, some objects may be so large that the copying involved in promoting them from the young generation is considered too expensive. Indeed, some may not even fit into the old generation. In any event, it is conventional, as was mentioned above, for objects new to the old generation to be placed into its youngest train.

SUMMARY OF THE INVENTION

But I have recognized that collection efficiency can be improved by adopting a different policy for allocation of directly allocated objects. Rather than place such objets in the youngest train, I place them somewhere ahead of that train, at least if the number of trains exceeds some minimum. This is advantageous because it reduces a drawback of direct allocation, namely, that the objects thus allocated are not subjected to young-generation objects' early collection, so a collector that employs direct allocation would conventionally fail to take advantage of infant mortality. By initially placing directly allocated objects at relatively advanced positions in the collection queue, the collector can reduce the average garbage residence time.

BRIEF DESCRIPTION OF THE DRAWINGS

The invention description below refers to the accompanying drawings, of which:

FIGS. 12A–12J, discussed above, are diagrams that illustrate a collection scenario that can result from using the train algorithm;

DETAILED DESCRIPTION OF AN ILLUSTRATIVE EMBODIMENT

Figure 13A:
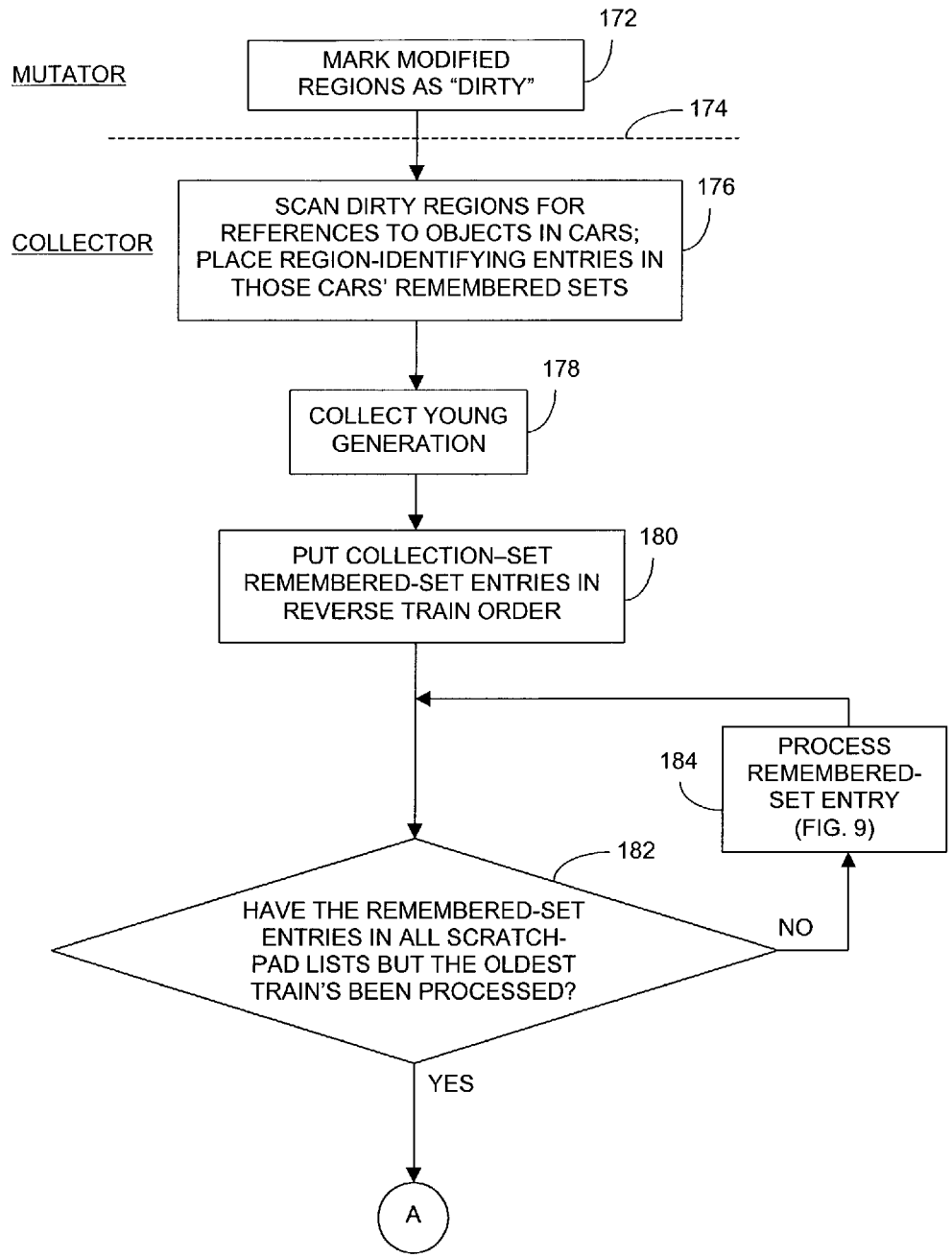
FIGS. 13A and 13B together constituted a flow chart that illustrates a collection interval, as FIGS. 8A and 8B do, but illustrates optimizations that FIGS. 8A and 8B do not include.
Figure 13B:
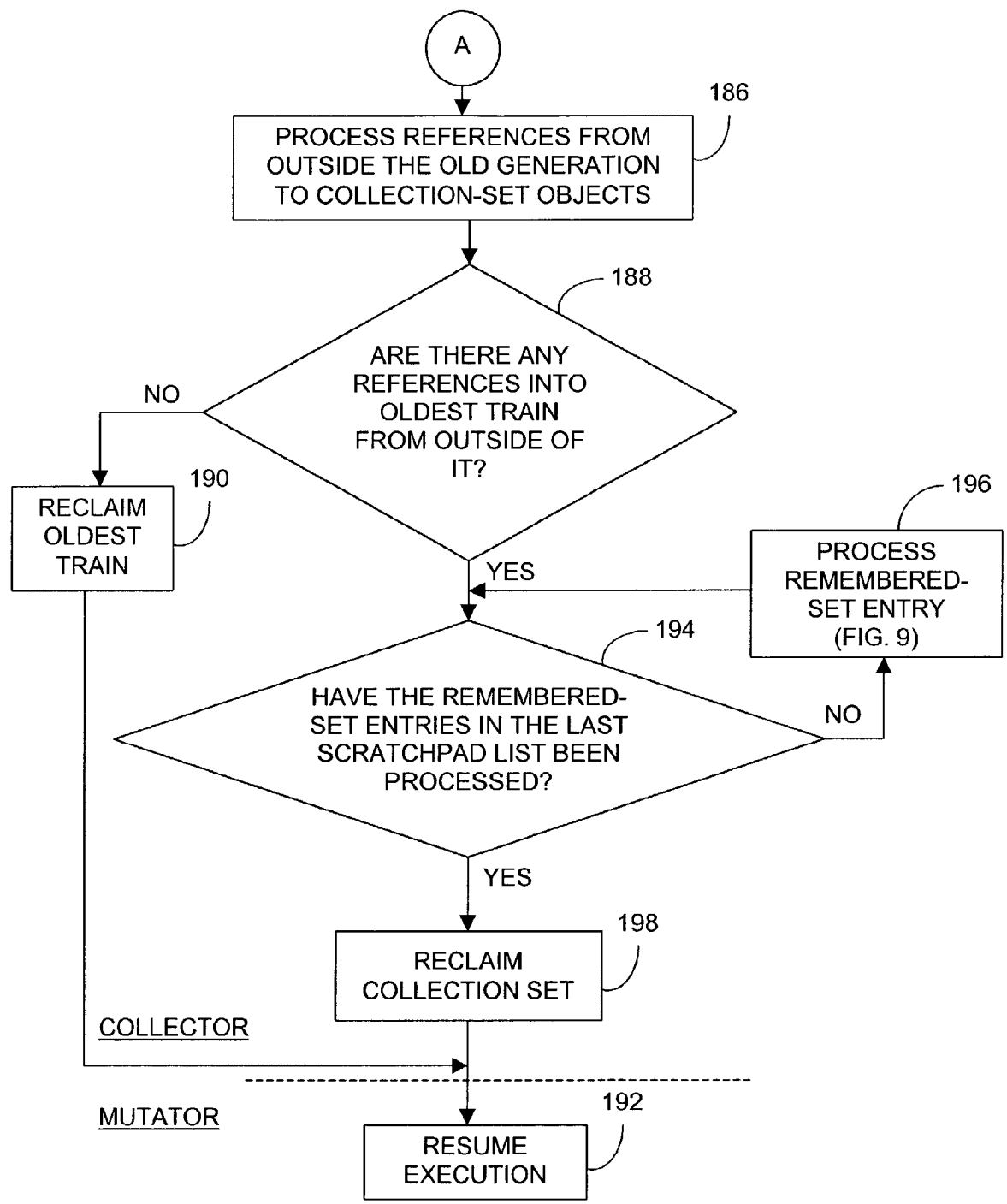

The present invention can be employed in any train-algorithm-based collector that allocates objects directly into the train-algorithm-based generation. However, whereas it was tacitly assumed above that, as is conventional, only a single car section would be collected in any given collection increment, I prefer to collect more than a single car per collection increment. FIGS. 13A and 13B (together, "FIG. 13") therefore depict a collection operation that is similar to the one that FIG. 8 depicts, but FIG. 13 reflects the possibility of multiple-car collection sets and depicts certain optimizations that some of the invention's embodiments may employ.

Figure 1:
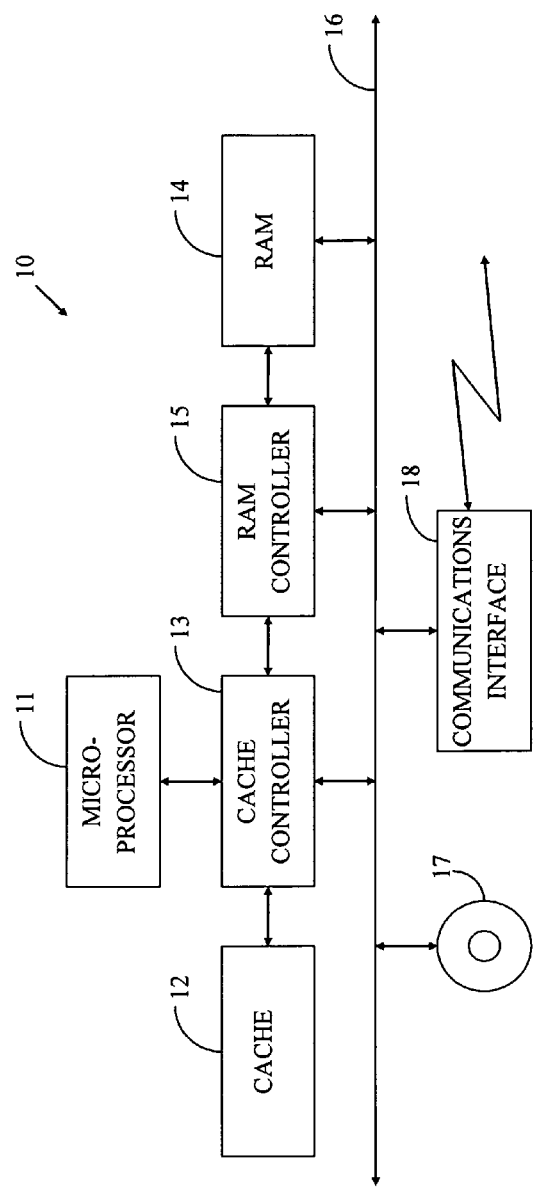
FIG. 1, discussed above, is a block diagram of a computer system in which the present invention's teachings can be practiced.
Figure 2:
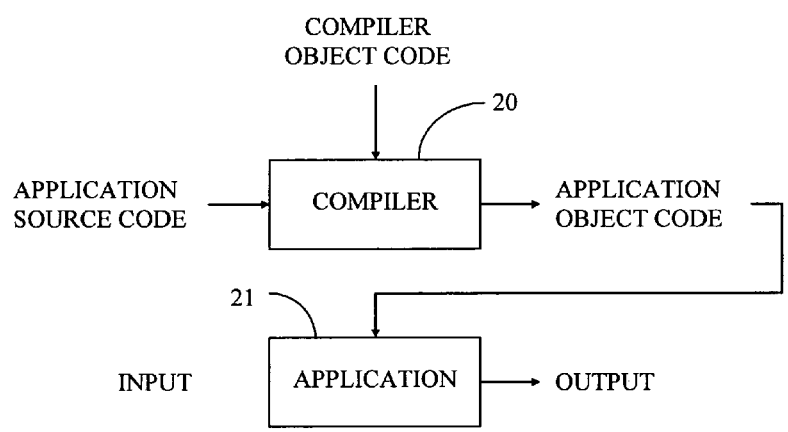
FIG. 2 is, discussed above, is a block diagram that illustrates a compiler's basic functions.
Figure 3:
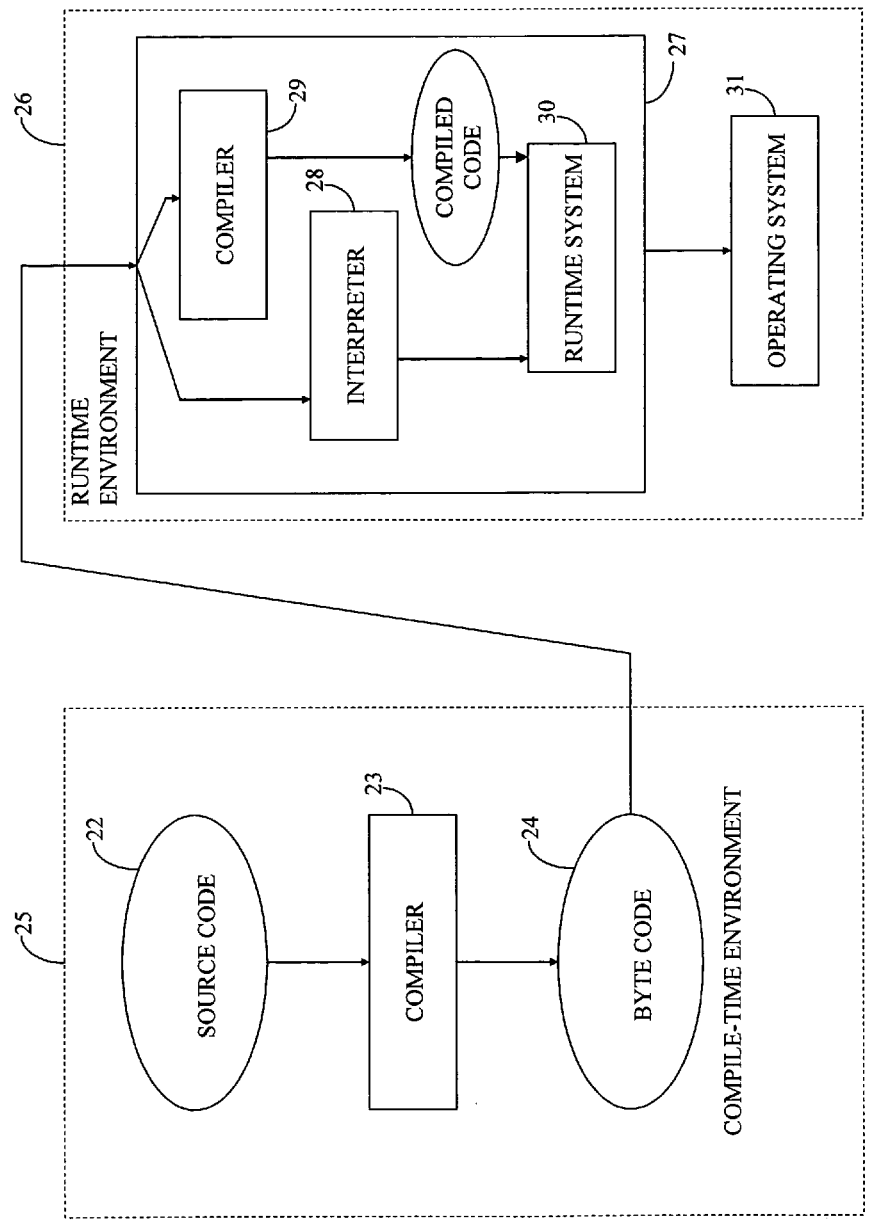
FIG. 3, discussed above, is a block diagram that illustrates a more-complicated compiler/interpreter organization.
Figure 4:
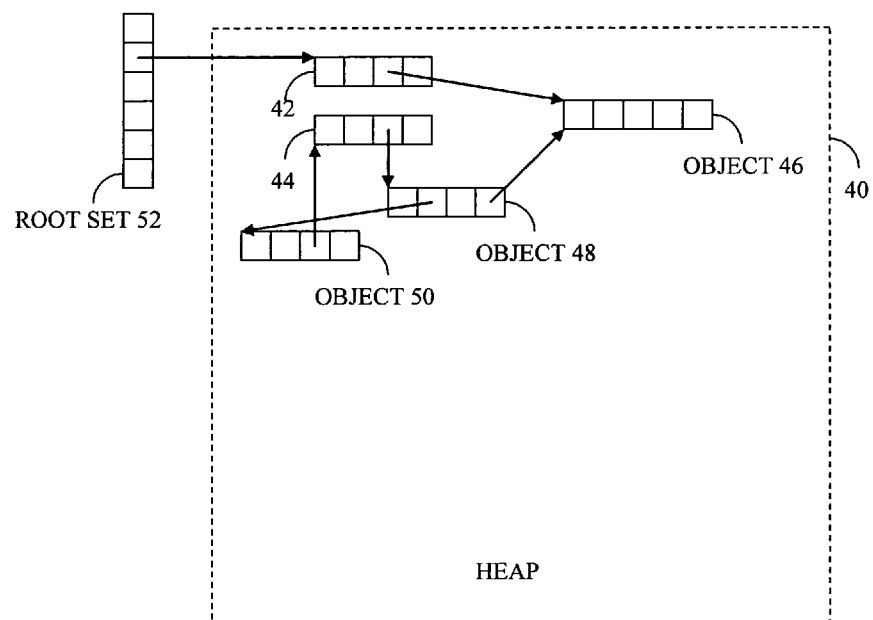
FIG. 4, discussed above, is a diagram that illustrates a basic garbage-collection mechanism.
Figure 5:
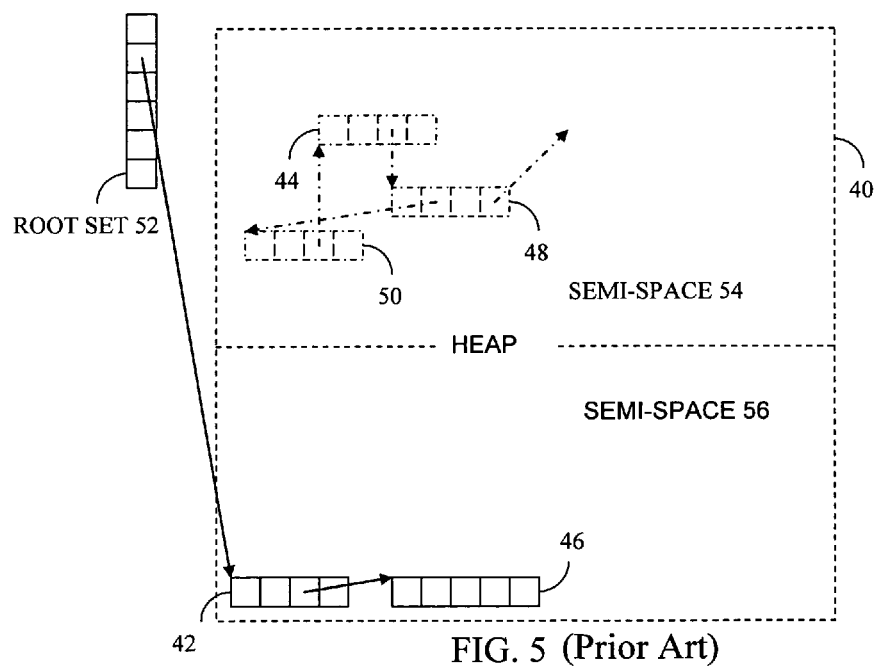
FIG. 5, discussed above, is a similar diagram illustrating that garbage-collection approach's relocation operation.
Figure 6:
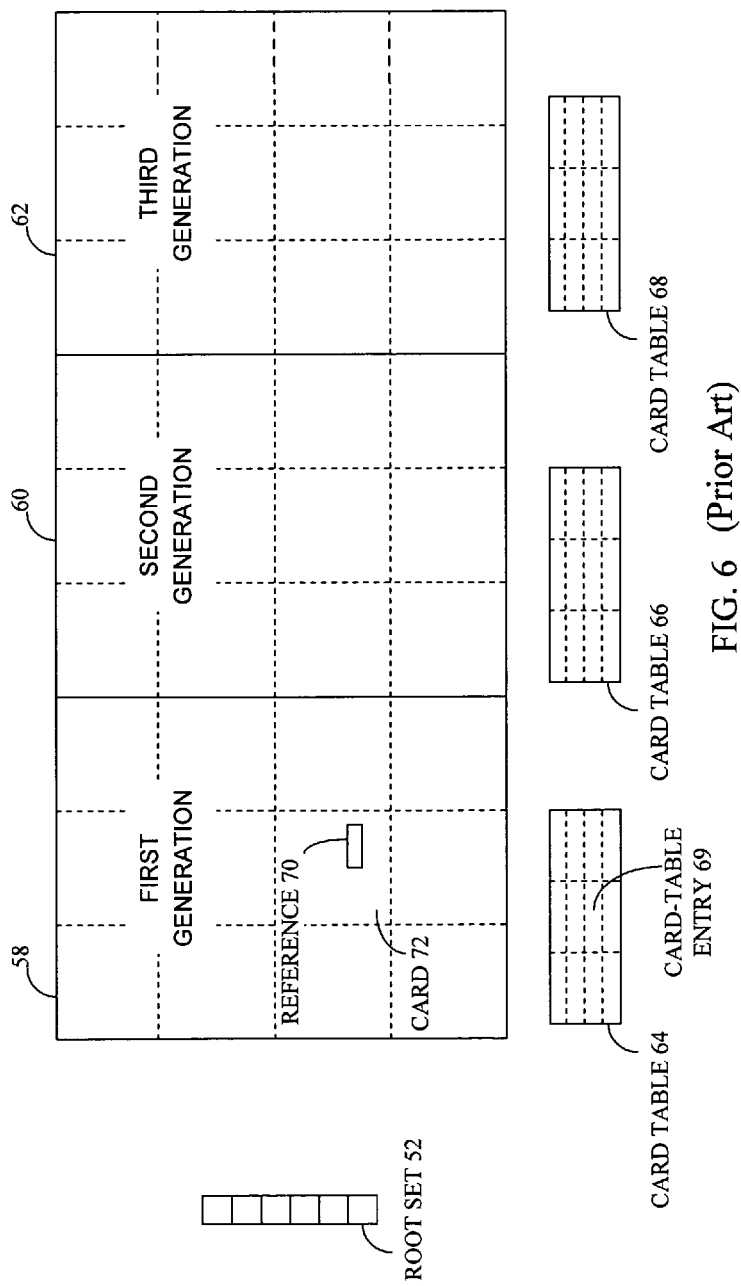
FIG. 6, discussed above, is a diagram that illustrates a garbage-collected heap's organization into generations.
Figure 7:
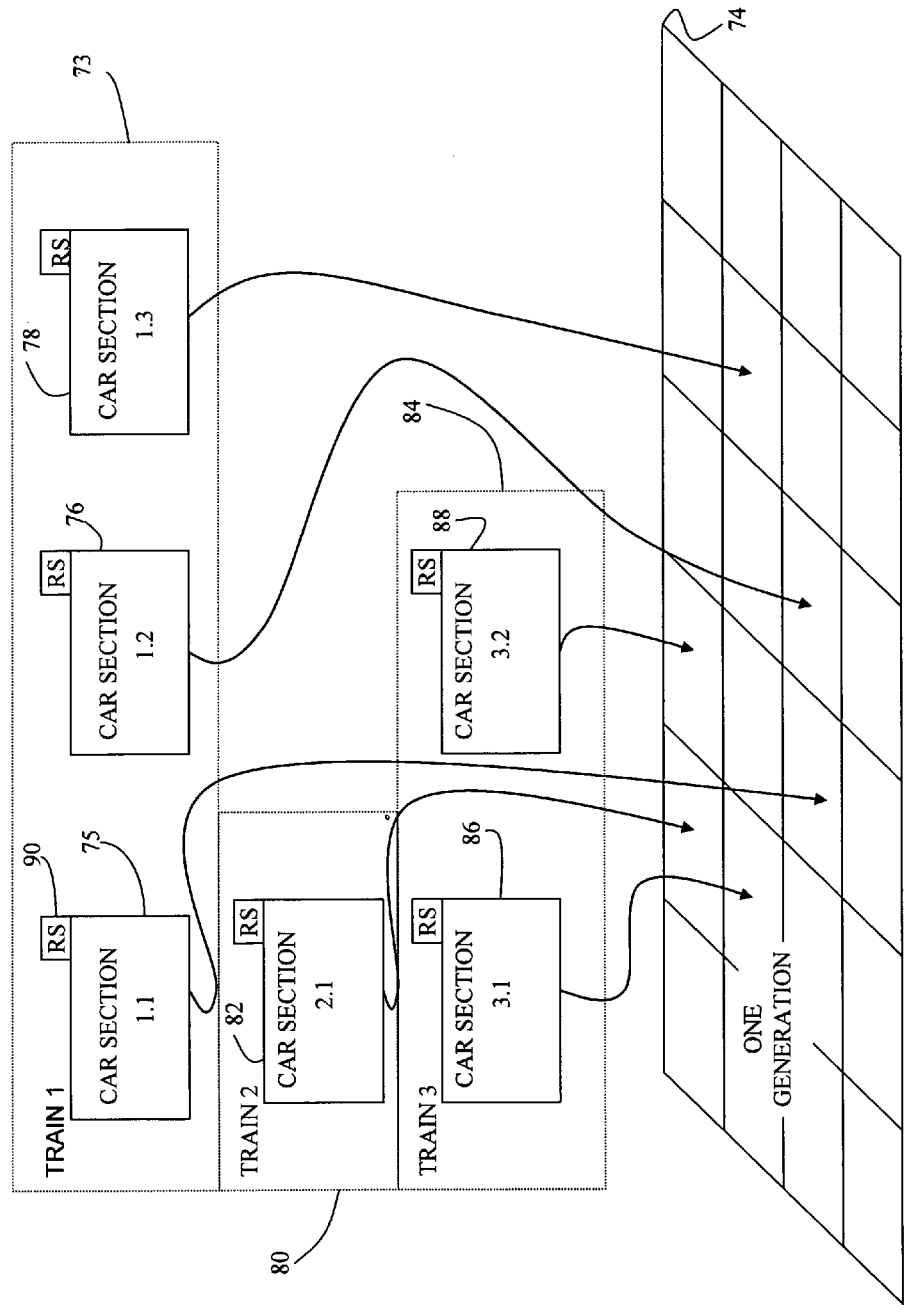
FIG. 7, discussed above, is a diagram that illustrates a generation organization employed for the train algorithm.
Figure 8A:
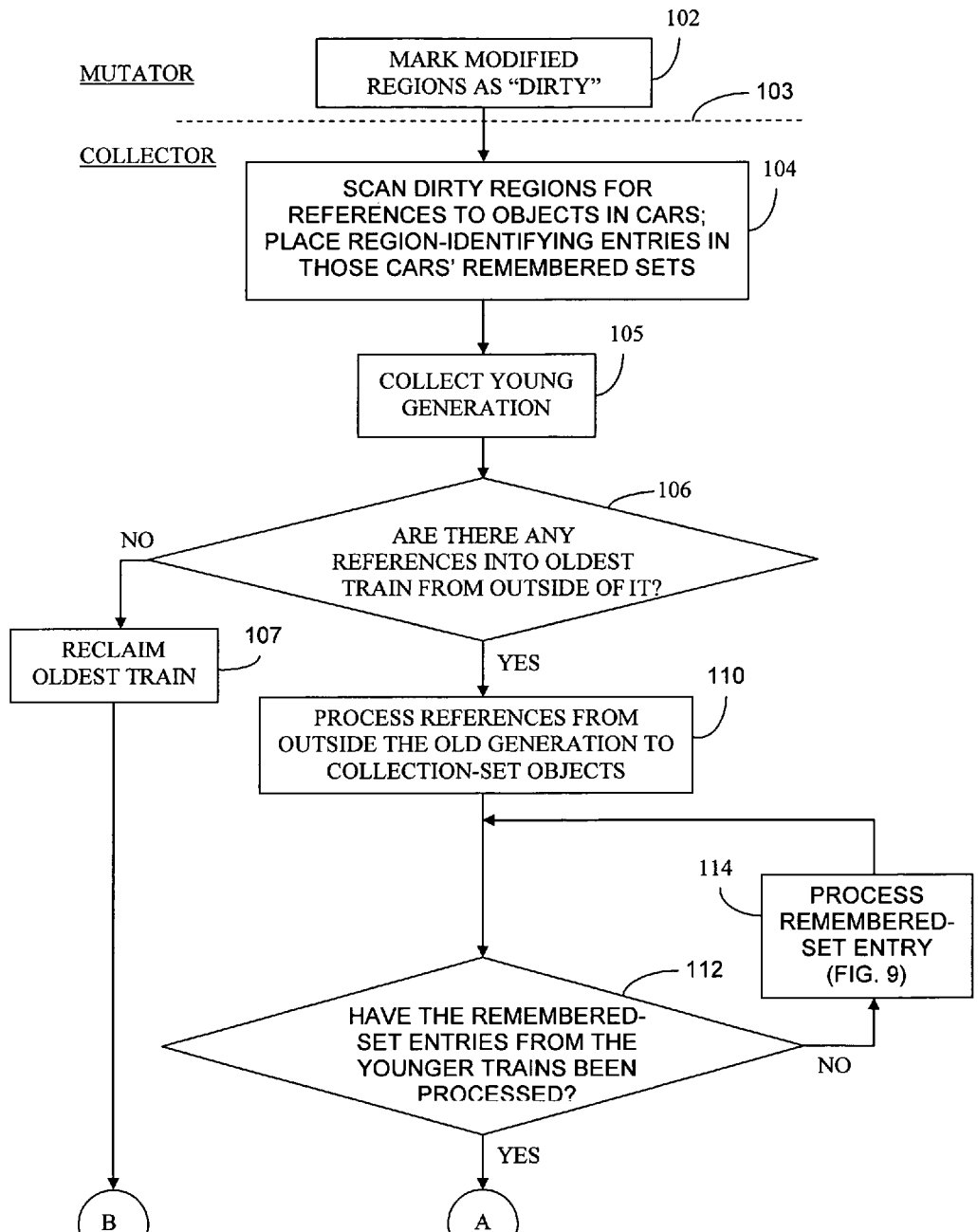
FIGS. 8A and 8B, discussed above, together constitute a flow chart that illustrates a garbage-collection interval that includes old-generation collection.
Figure 8B:
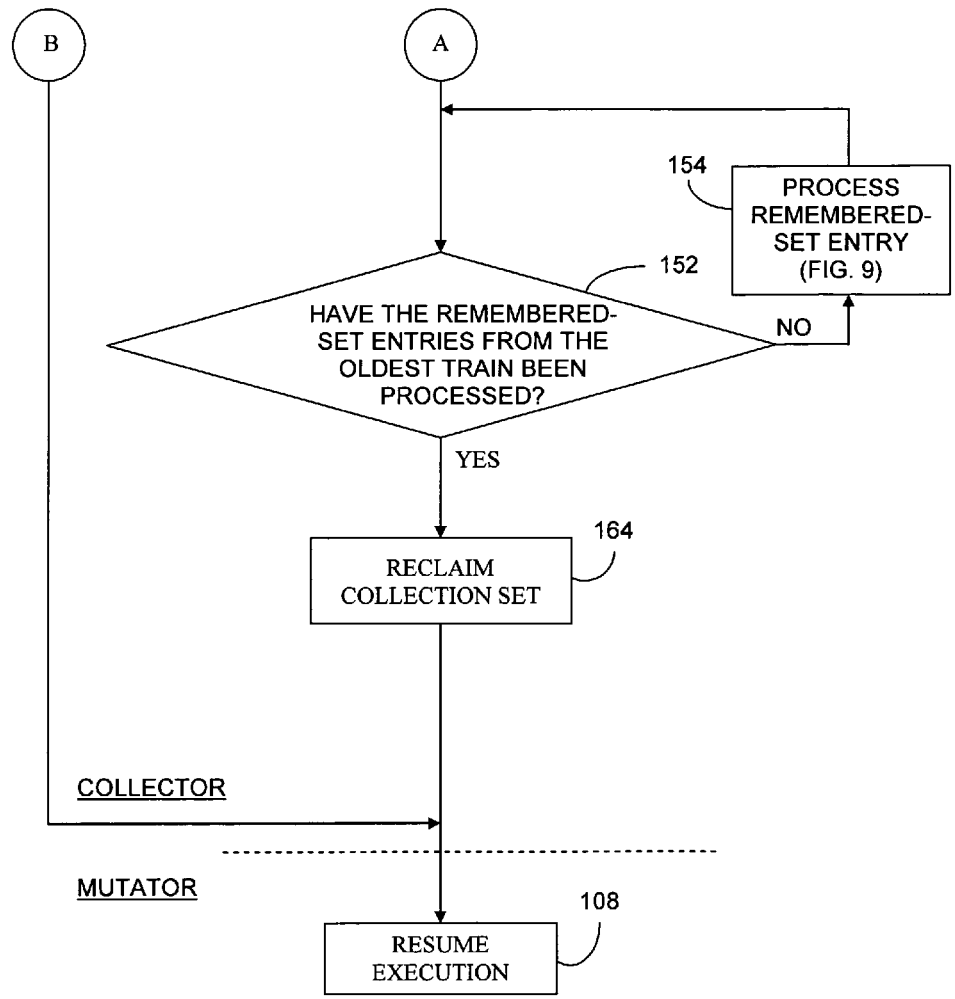
Figure 9:
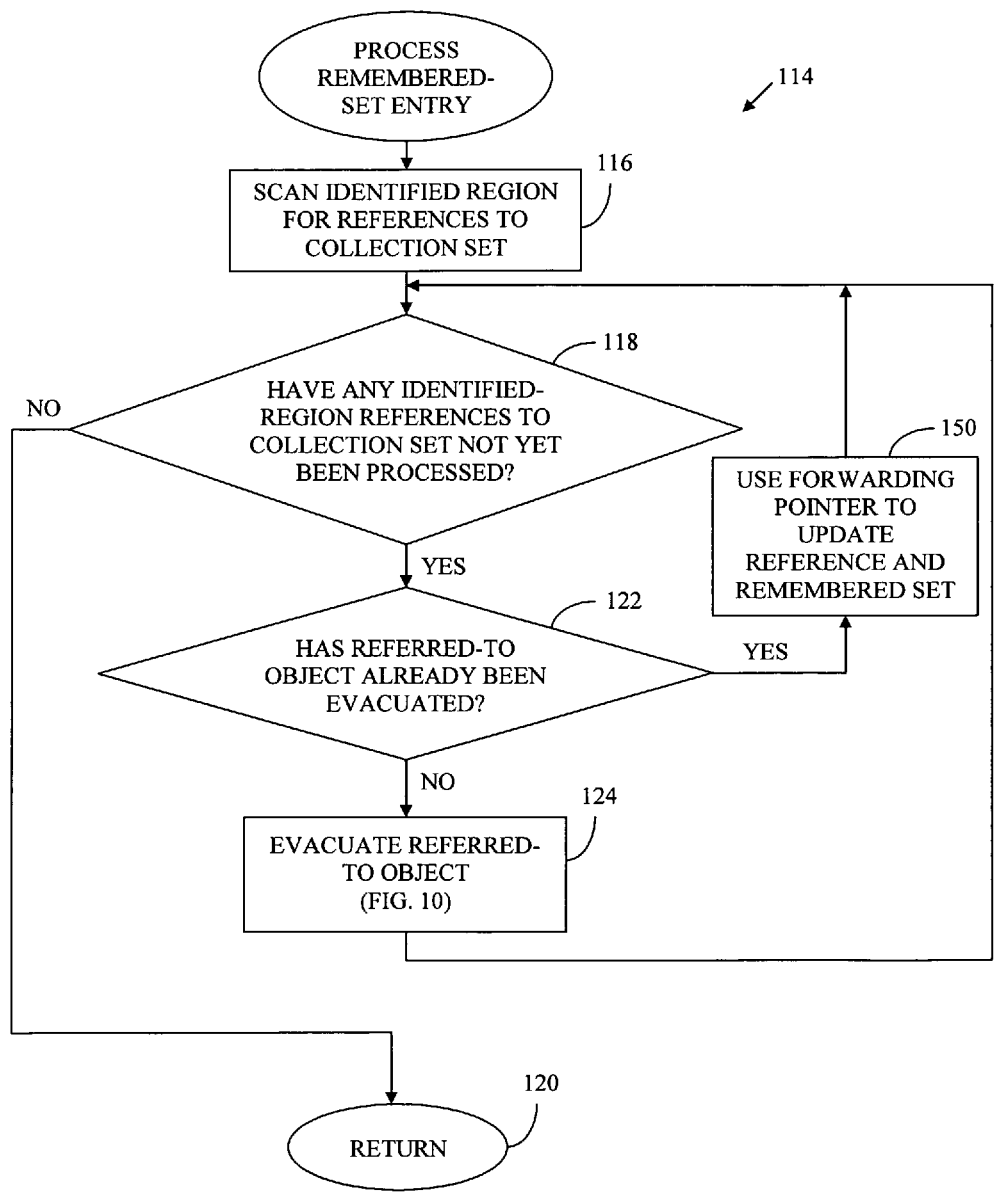
FIG. 9, discussed above, is a flow chart that illustrates in more detail the remembered-set processing included in FIG. 8A.
Figure 10:
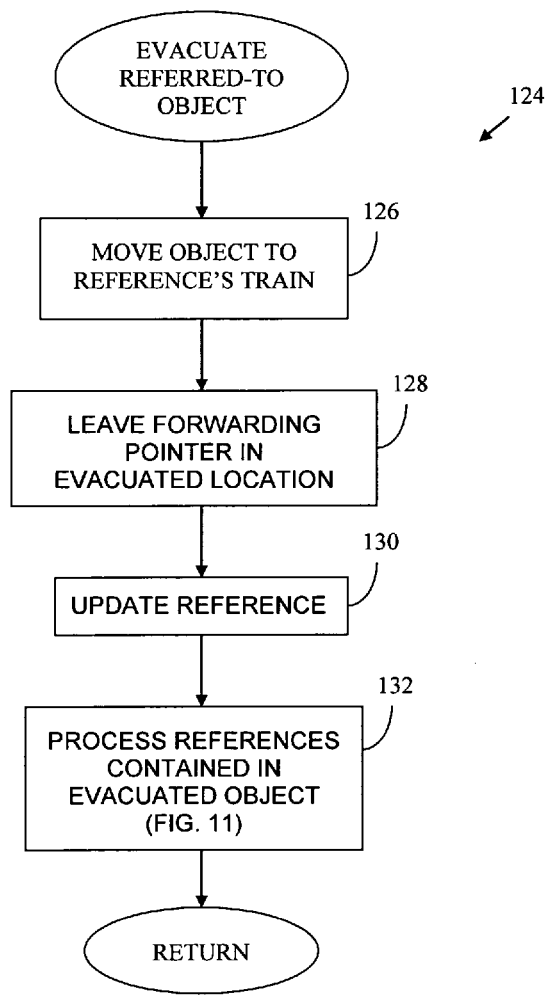
FIG. 10, discussed above, is a block diagram that illustrates in more detail the referred-to-object evacuation that FIG. 9 includes.
Figure 11A:
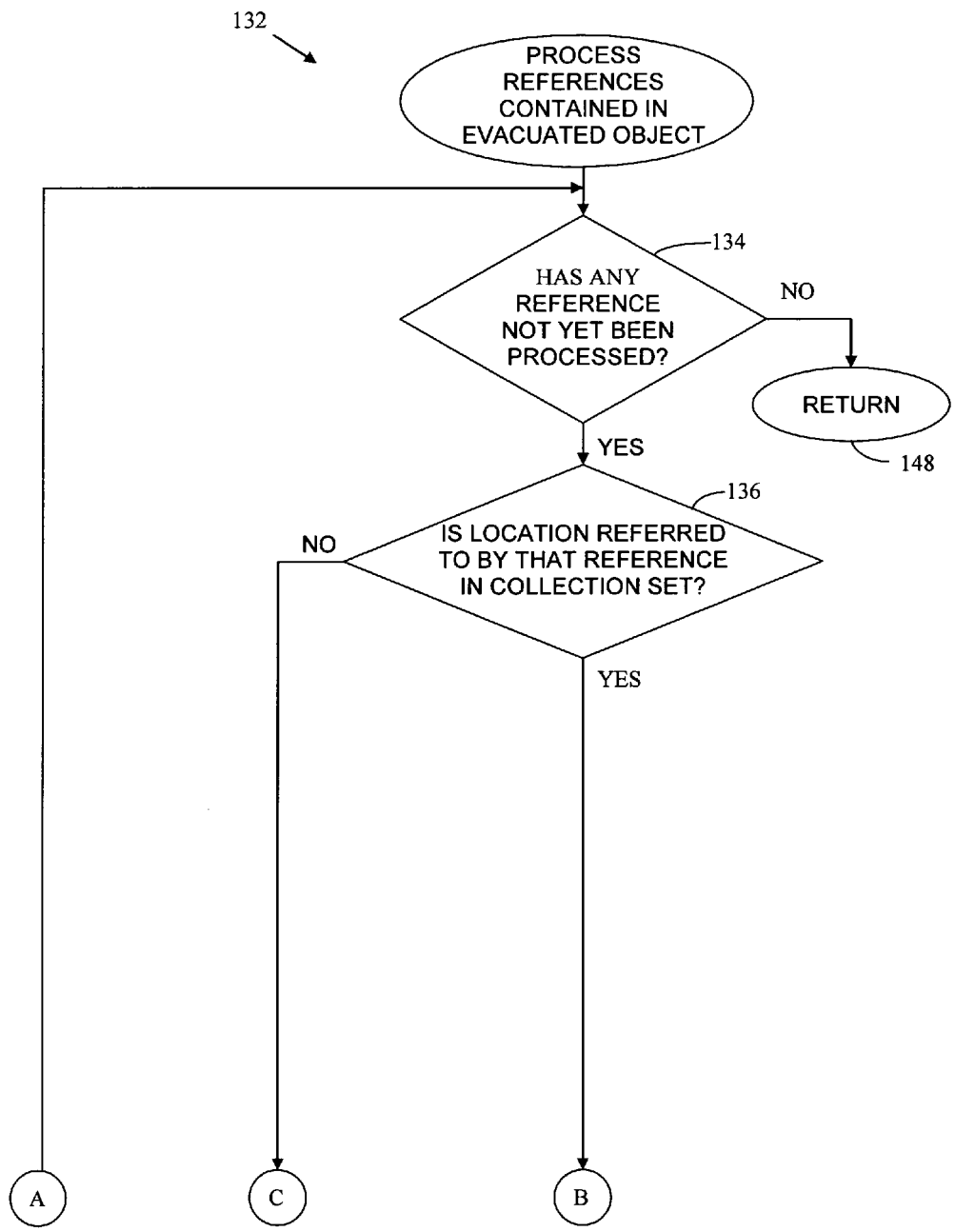
FIGS. 11A and 11B, discussed above, together form a flow chart that illustrates in more detail the FIG. 10 flow chart's step of processing evacuated objects' references.
Figure 11B:
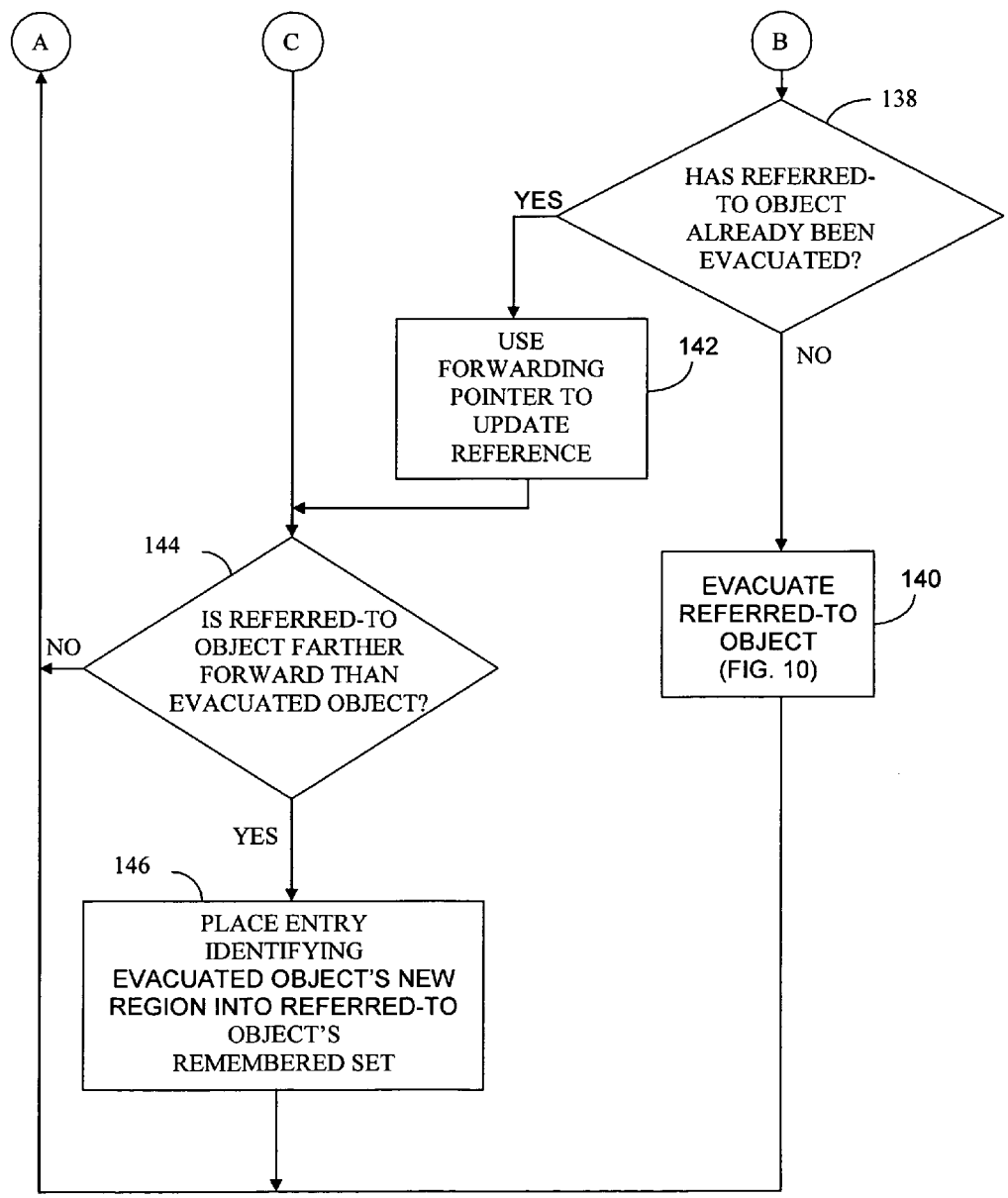
Figure 12A:
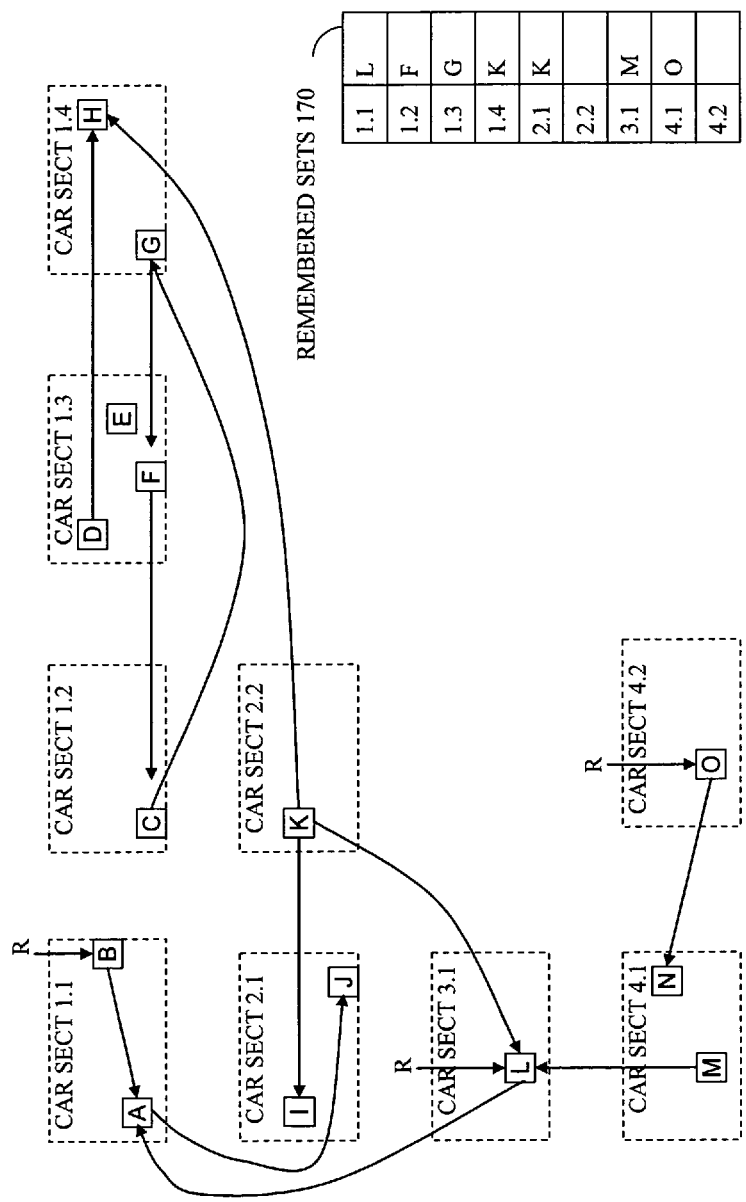
Figure 12B:
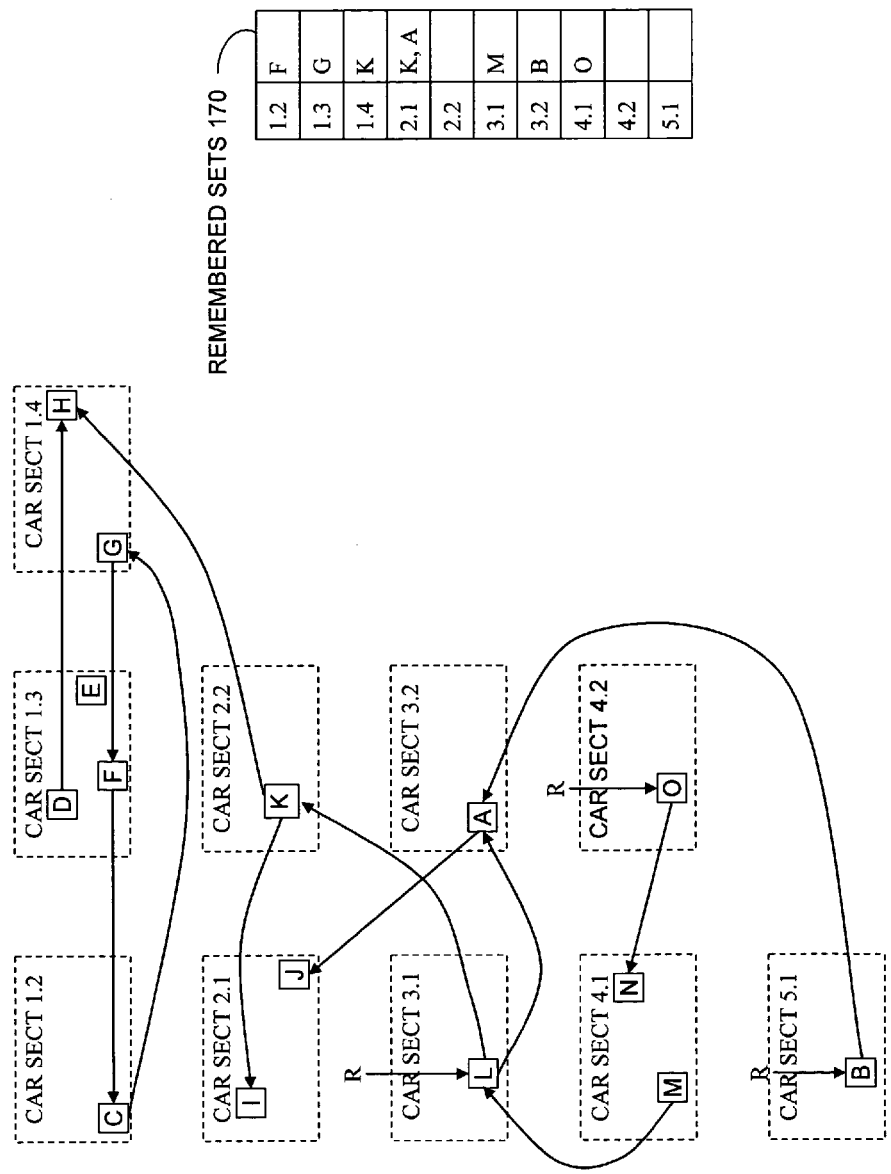
Figure 12C:
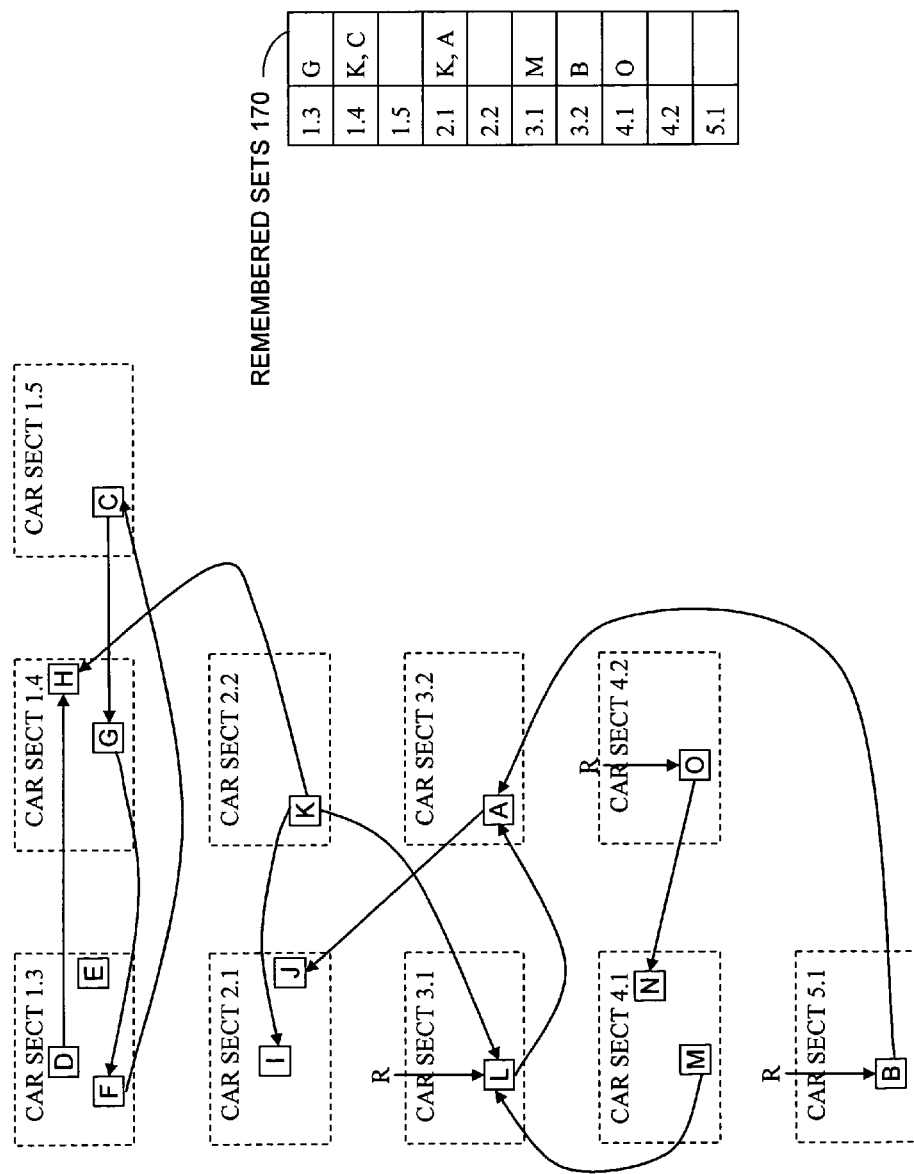
Figure 12D:
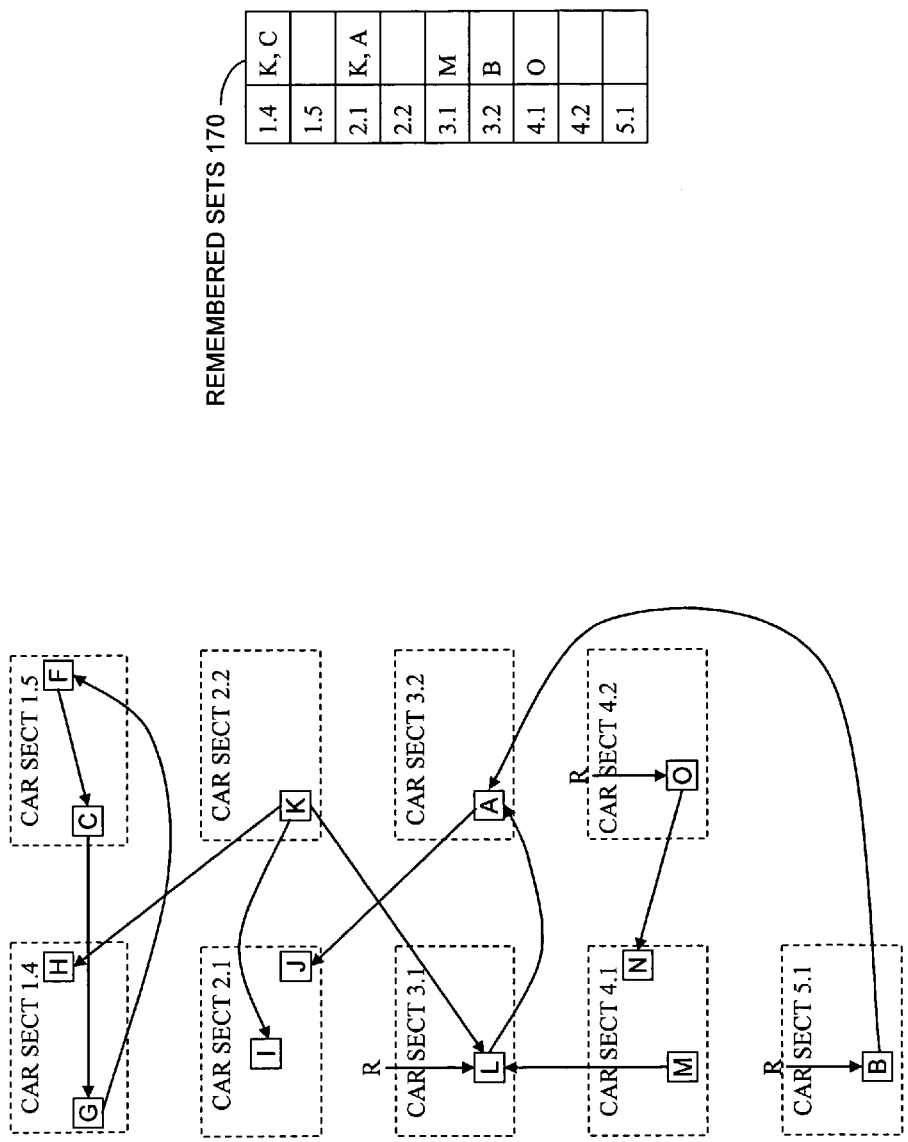
Figure 12E:
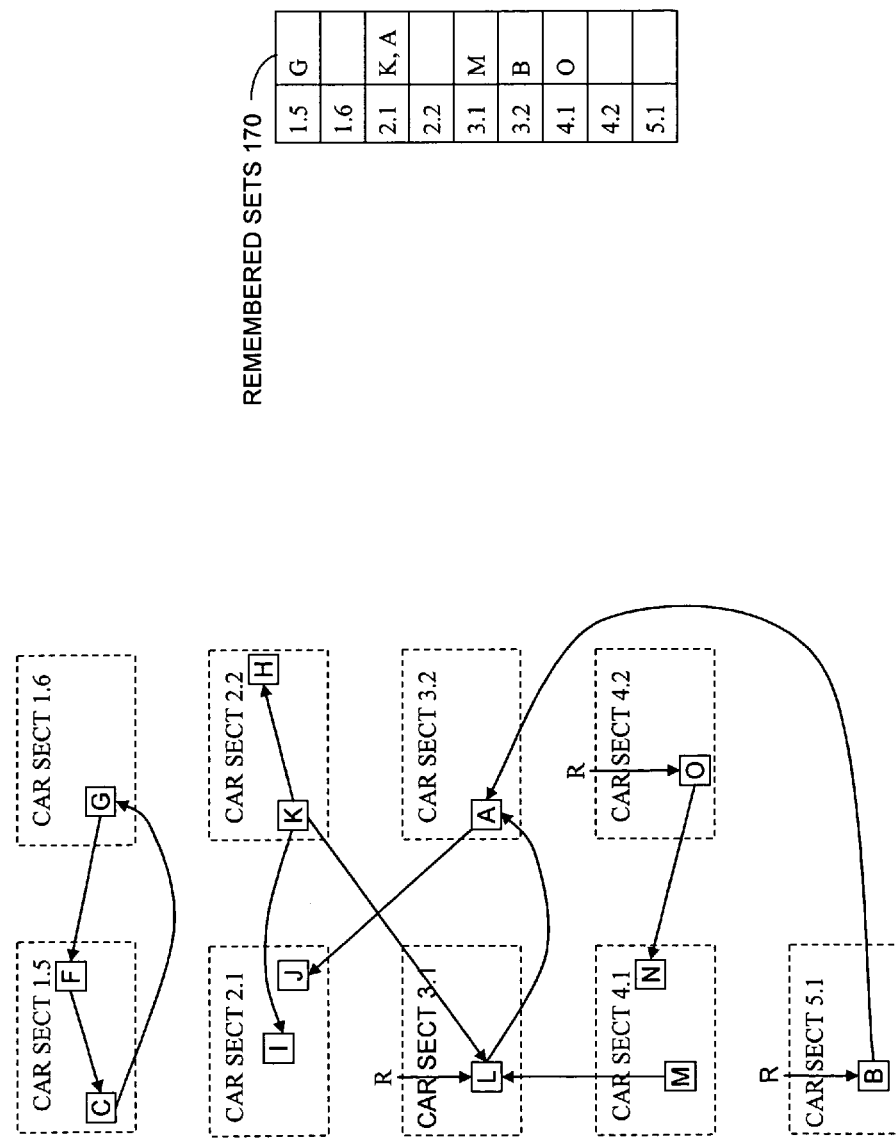
Figure 12F:
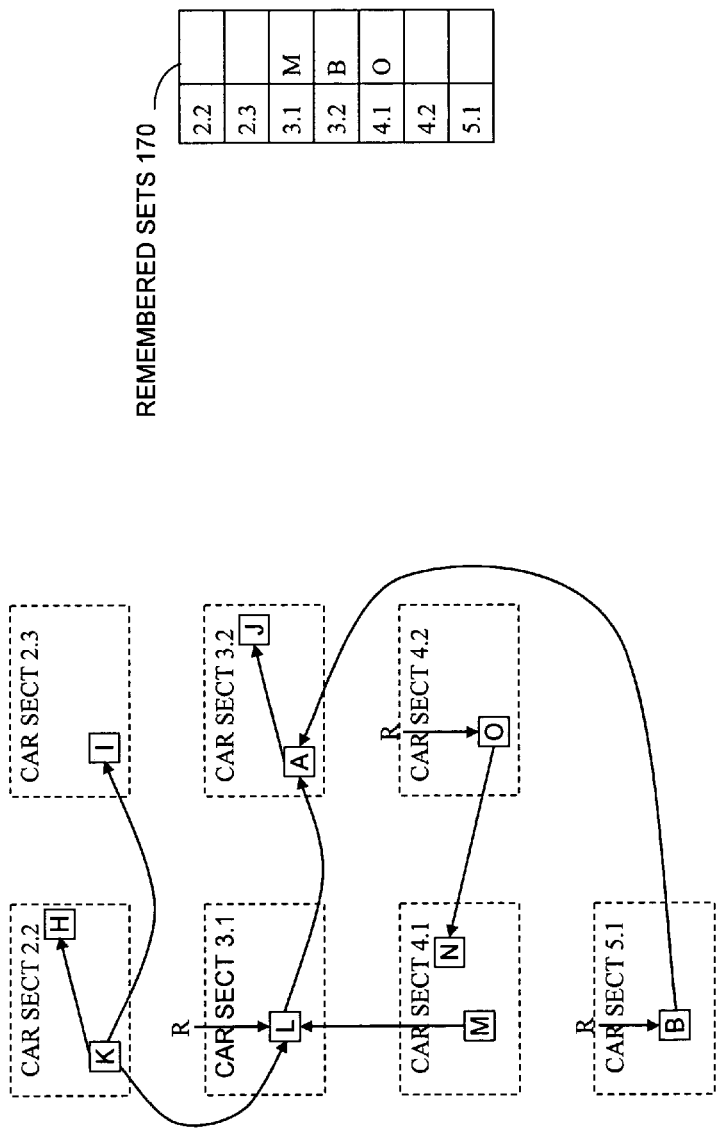

Blocks 172, 176, and 178 represent operations that correspond to those that FIG. 8's blocks 102, 106, and 108 do, and dashed line 174 represents the passage of control from the mutator to the collector, as FIG. 8's dashed line 104 does. For the sake of efficiency, though, the collection operation of FIG. 13 includes a step represented by block 180. In this step, the collector reads the remembered set of each car in the collection set to determine the location of each reference into the collection set from a car outside of it, it places the address of each reference thereby found into a scratch-pad list associated with the train that contains that reference, and it places the scratch-pad lists in reverse-train order. As blocks 182 and 184 indicate, it then processes the entries in all scratch-pad lists but the one associated with the oldest train.

Before the collector processes references in that train's scratch-pad list, the collector evacuates any objects referred to from outside the old generation, as block 186 indicates. To identify such objects, the collector scans the root set. In some generational collectors, it may also have to scan other generations for references into the collection set. For the sake of example, though, we have assumed the particularly common scheme in which a generation's collection in a given interval is always preceded by complete collection of every (in this case, only one) younger generation in the same interval. If, in addition, the collector's promotion policy is to promote all surviving younger-generation objects into older generations, the only generations that need to be scanned are any older ones, of which there are none in the example; i.e., some embodiments may not require that the young generation be scanned in the block-186 operation.

For those that do, though, the scanning may actually involve inspecting each surviving object in the young generation, or the collector may expedite the process by using card-table entries. Regardless of which approach it uses, the collector immediately evacuates into another train any collection-set object to which it thereby finds an external reference. The typical policy is to place the evacuated object into the youngest such train. As before, the collector does not attempt to evacuate an object that has already been evacuated, and, when it does evacuate an object to a train, it evacuates to the same train each collection-set object to which a reference in the thus-evacuated object refers. In any case, the collector updates the reference to the evacuated object.

When the inter-generational references into the generation have thus been processed, the garbage collector determines whether there are any references into the oldest train from outside that train. If not, the entire train can be reclaimed, as blocks 188 and 190 indicate.

As block 192 indicates, the collector interval typically ends when a train has thus been collected. If the oldest train cannot be collected in this manner, though, the collector proceeds to evacuate any collection-set objects referred to by references whose locations the oldest train's scratch-pad list includes, as blocks 194 and 196 indicate. It removes them to younger cars in the oldest train, again updating references, avoiding duplicate evacuations, and evacuating any collection-set objects to which the evacuated objects refer. When this process has been completed, the collection set can be reclaimed, as block 198 indicates, since no remaining object is referred to from outside the collection set: any remaining collection-set object is unreachable. The collector then relinquishes control to the mutator.

Figure 14:
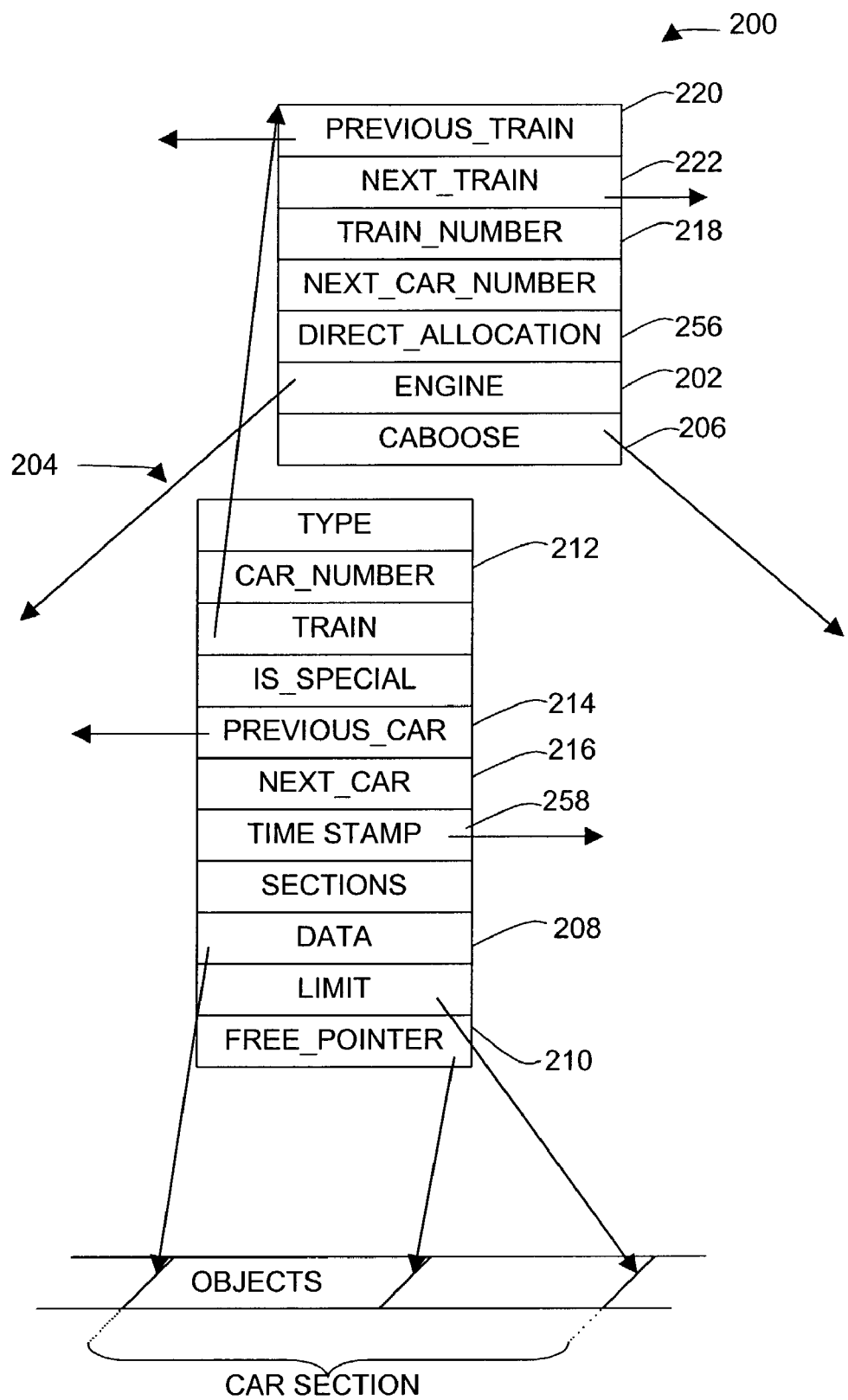
FIG. 14 is a data-structure diagram that illustrates structures that contain metadata used to support the ordering of trains and cars.

Independently of whether the collector employs the approach of FIG. 13 or FIG. 8 or some other approach, a collector that employs the train algorithm needs to impose some order among the trains and cars. The present invention's advantages do not depend on how this is done. For the sake of concreteness, though, FIG. 14 depicts exemplary simplified data structures that exhibit features used by some train-algorithm implementations.

One way of providing a train organization is to allocate a new data structure each time a new train is added (and to free the data structure when that train is removed). The particular data employed to represent the train will differ among different embodiments, but there will need to be some way to connect the trains to their respective cars. One way is to include a pointer, which FIG. 14 exemplifies by pointer 202, to data structures such as data structure 204 containing metadata for the car sections that belong to the train. FIG. 14 depicts the train data structure 200 as including both a pointer to the first car's metadata and a pointer 206 to the last car's metadata. The composition of the data structure 204 employed to contain a car's metadata will be implementation-dependent, too, but FIG. 14 depicts it for the sake of example as including a pointer 208 to the actual car section. There typically would also be a free pointer, represented by block 210, to indicate where an object should be placed if it is to added to the car section.

Of most interest for present purposes are the data that the collector employs to specify the intended collection order among trains and cars. For example, the car structure may include an entry 212 containing a number associated with a car. The car's location within the intended collection sequence can be determined by comparing this number with other cars' corresponding numbers. To find the data structures for the various cars within a train, FIG. 14 employs blocks 214 and 216 to represent fields that the collector may use to support a double-threaded linked list of the cars within the train. The linkage order may be used instead of, or in addition to, explicit numbering to specify the logical ordering of a given train's cars.

The collector may employ similar fields in the train data structure to specify the trains' order in the collection sequence. FIG. 14 represents this by a train-number field 218 as well as pointer fields 220 and 222 used to support a linked list of train data structures.

Figure 15:
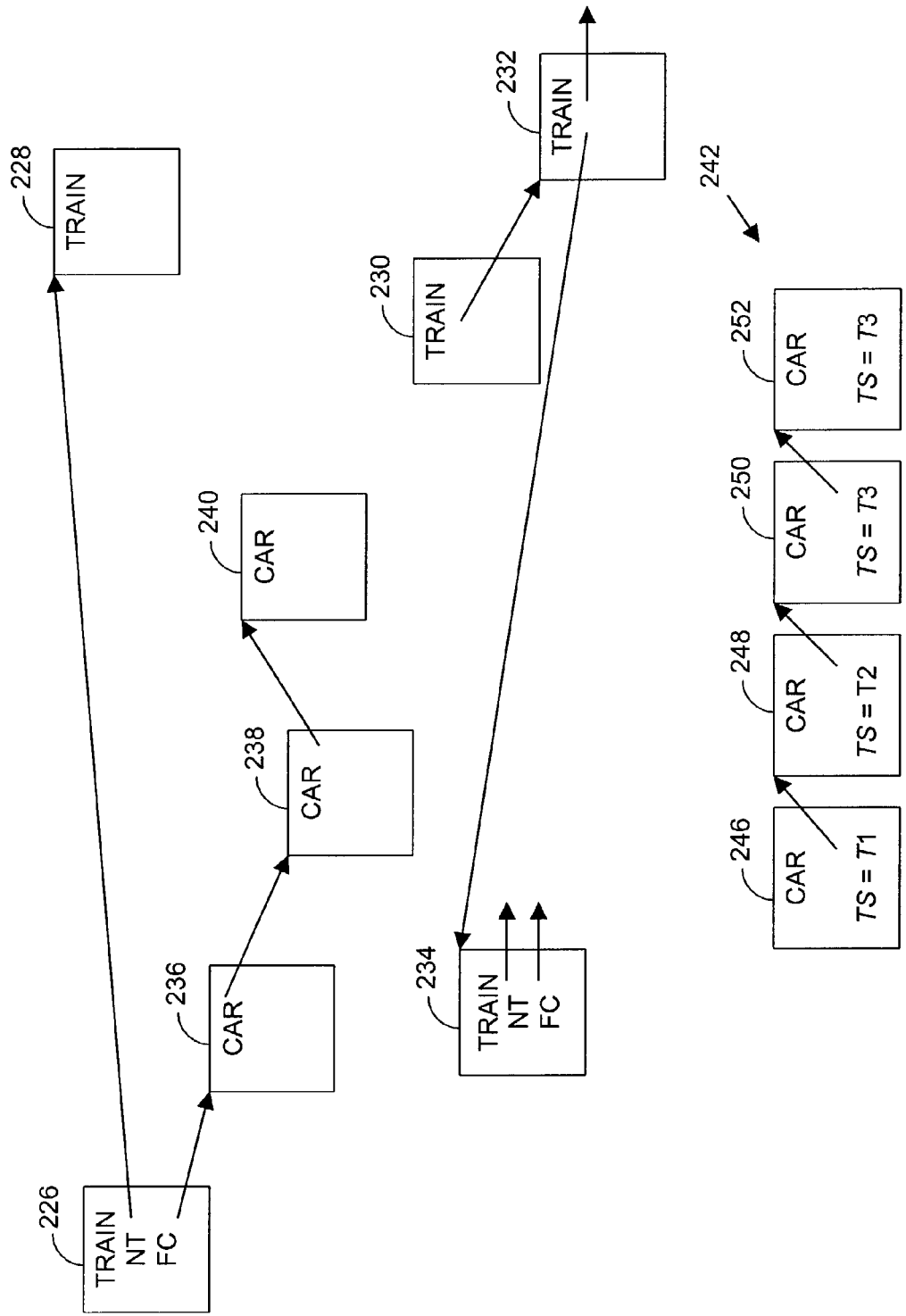
FIG. 15 is a diagram that illustrates an example resultant relationship among trains and cars that prevails before allocation cars have been linked into trains.

FIG. 15 is a diagram that illustrates a resultant organization. Block 226 represents one train data structure, and it is depicted as including a next-train pointer to a further train data structure 228. (FIG. 14 depicts the train data structure as supporting doubly threaded linked lists. For the sake of simplicity, though, FIG. 15 depicts the structures as employing only a single pointer each for that purpose.) Respective train structures specify a collection order in which train 226 is followed by trains 228, 230, 232, and 234, in that order. Each train should somehow identify the cars that belong to it. FIG. 15 indicates this by depicting train 226 as including a first-car pointer, which points to a linked list of three car structures 236, 238, and 240. For the sake of simplicity, FIG. 14 omits the other trains' cars, but those trains, too, would identify the cars that belong to them.

FIG. 15 also shows a linked list 242 of car data structures that have been allocated in the train-algorithm-managed generation since the generation's last collection increment and that do not yet belong to trains. Now, most objects that are newly placed into the train-algorithm-managed generation are placed there as a result of promotion from the young generation, and they are placed either (1) into cars belonging to trains that contain references to them or (2) if no references in the train-algorithm-managed generation refer to them, into cars belonging to the youngest train. But the objects located in the car section with which the car data structures in list 242 are associated have been allocated there by the mutator directly; they have not previously resided in the young generation, typically because they exceeded some size threshold. And, in accordance with the present invention, their cars will not necessarily be assigned to the youngest train; the collector will usually place them farther forward in the collection sequence.

Figure 16:
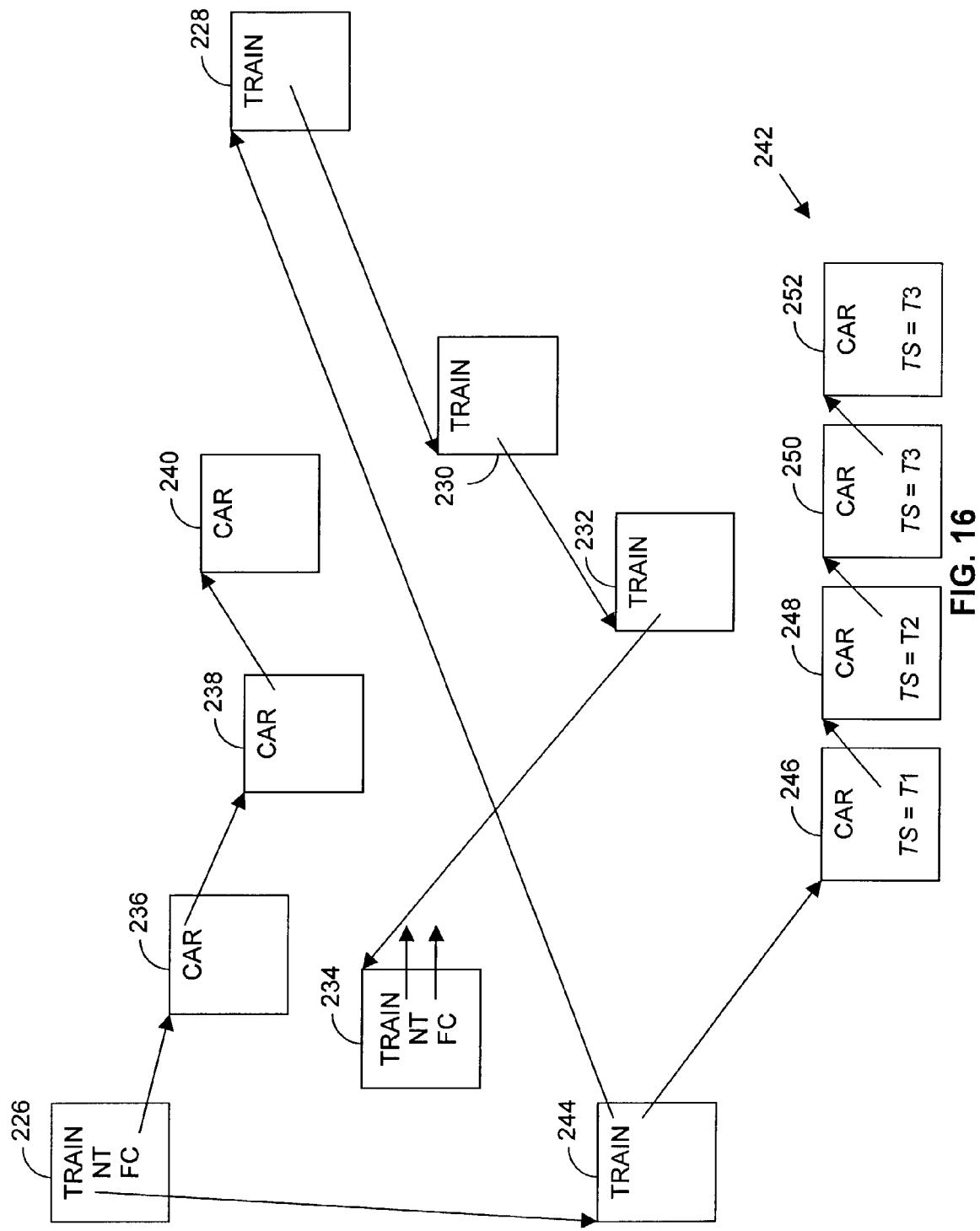
FIG. 16 is a similar diagram that illustrates the result of linking allocation cars into a single train.

FIG. 16 illustrates one approach to doing so. Here we assume that train 226 is the oldest train and that all cars belonging to the current collection increment's collection set belong to that train. The collector creates a new train, represented by a new data structure 244, and links it into the train list ahead of the first train, train 228, that contains no collection-set cars, i.e., ahead of train 228. As the drawing illustrates, that train contains all of the cars 246, 248, 250, and 252 that contain objects directly allocated since the previous collection increment.

As was observed above, objects that have not previously survived a collection tend to become garbage rapidly, while survivors tend to remain reachable for a relatively long time. Since none of the objects in cars 246, 248, 250, and 252 has yet survived a collection, a large percentage are likely to become garbage quickly, so placing them near the front of the collection queue tends to result in early reclamation of a large amount of heap space. Now, this rationale tends to suggest that the allocation cars be placed into the collection set immediately or into the oldest train instead of behind it. Indeed, some of the invention's embodiments may employ this approach. I prefer the approach that FIG. 16 illustrates, though, because it tends to result in better placement of the objects that do survive the collection. Specifically, it tends to allow more time for other objects in the generation to acquire references to the surviving objects, so the collector will evacuate those surviving objects to the trains that contain references to them. Too-early collection results in more surviving objects' being referred to only by references outside the generation and in their consequently being evacuated to the youngest train.

While FIG. 16's relatively simple approach to advancing directly allocated objects' placement is beneficial, some embodiments of the invention may make the placement more adaptive. One approach, for instance, is to make the location into which an allocation train is linked vary with the rate at which objects in allocation trains survive. There are many ways to do this.

Suppose, for example, that each train structure includes a field, such as field 256 in FIG. 14's train structure 200, that indicates whether the train is a direct-allocation train. A similar field could additionally or instead be included in each car structure. When the collector collects a car thereby identified as being of the direct-allocation variety, it can determine the car's byte count by, say, referring to its free pointer 210. At the end of the collection increment, the collector can obtain a survival rate by dividing the total of all byte counts for direct-allocation cars in the collection set into the total number of bytes evacuated from direct-allocation cars.

For that calculation, the number used as the total number of bytes evacuated from such cars can be obtained by keeping a running total that is updated each time an object is evacuated from a direct-allocation car. Or, if all collection-set cars are of the direct-allocation variety, the amount of evacuation can be obtained directly from the increase in the number of bytes contained in cars located outside the collection set. (This is readily determined from (1) the free pointers of all trains' youngest cars at the beginning of the collection increment and (2) the free pointers in all added cars at the end of the collection increment.)

If the resultant survival rate is below some threshold, the allocation-train insertion point used for the next allocation increment can be moved farther back if the insertion point has not already reached the end of the queue or some limit that the collector impose. If it exceeds another (or the same) threshold, then the insertion point can be moved forward if the insertion point is not already at the beginning of the queue.

Also, some embodiments may employ more than a single allocation train so that objects allocated at different times within the interval between collection increments can be differently placed within the collection queue. For this purpose, the car data structures may include time-stamp fields, as FIG. 14's block 258 illustrates. The time-stamp field would indicate when the car was first allocated, when the last object in it was allocated, or both. Although the "time" used for this purpose could be real time, it would more typically be expressed in terms of the number of bytes that have been allocated in the heap since the end of the previous collection increment. This is a quantity that collectors conventionally keep track of, so it is readily obtained.

Figure 17:
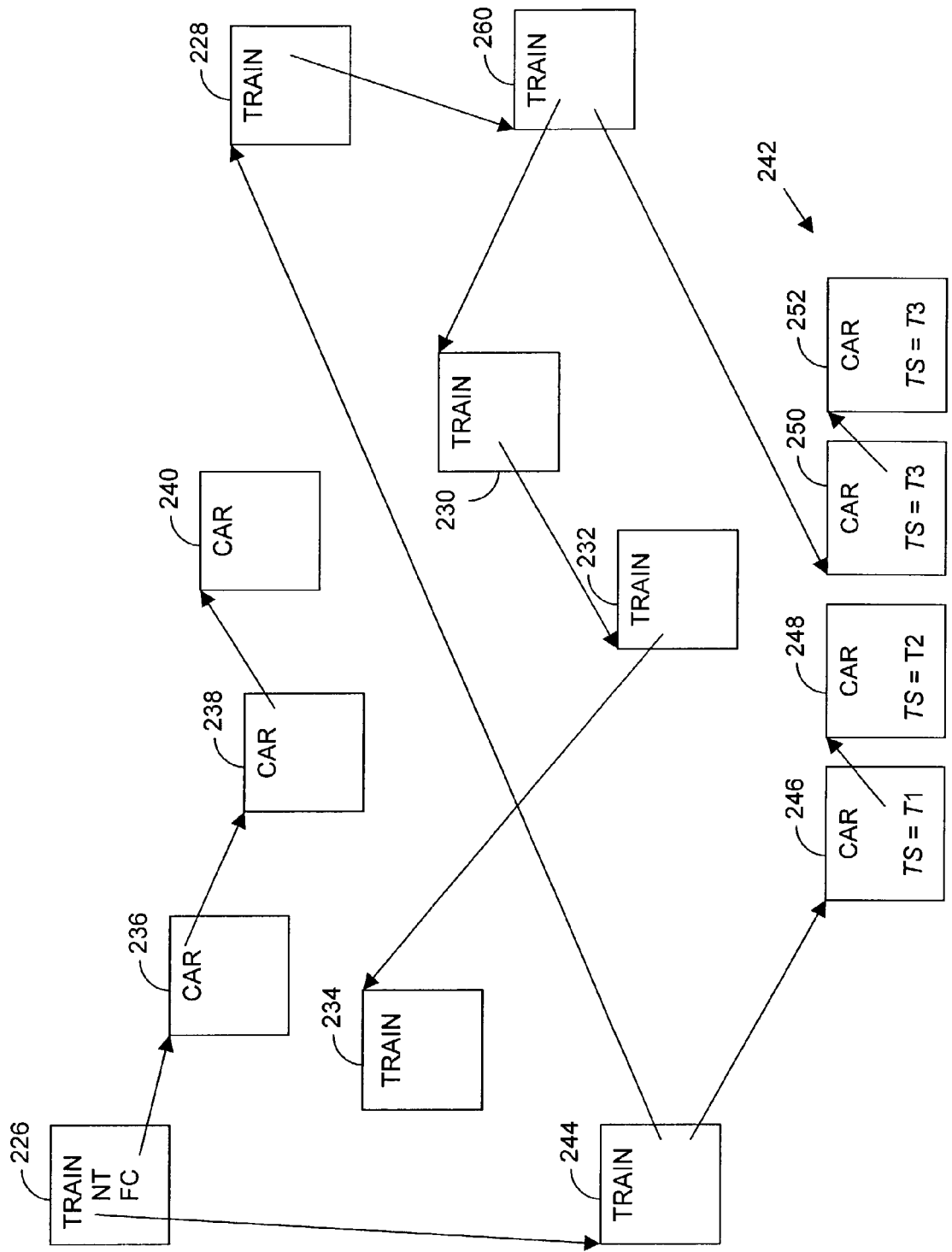
FIG. 17 is a similar diagram that illustrates the result of linking allocation cars into a plurality of trains.

Suppose that the time stamps thus recorded for FIG. 15's cars 246, 248, 250, and 252 are respectively $t_1$, $t_2$, $t_3$, and $t_4$ and that the collector compares those values with a time threshold that it uses in determining where to place the cars. Suppose further that the $t_1$ and $t_2$ values are less than the threshold but that values $t_3$ and $t_4$ exceed it. The result may be similar to that depicted in FIG. 17: cars 246 and 248 belong to a train 244 that is linked immediately behind the oldest train 226, whereas cars 250 and 252 are linked in another train 260, which is linked behind train 228.

Instead of using time stamps, the collector could simply use the order in which the cars were allocated as the basis for determining their placement. In any event, the rationale for treating the cars differently is that the objects located in the younger cars would not have had as much time to acquire old-generation references to them as the earlier allocated cars' objects would have, so making them potentially wait longer for collection may improve survivor placement. Of course, more than two allocation trains could be used, too, by employing more than one threshold. And, as was mentioned above, some embodiments may place the earliest cars directly into the collection set.

Note that the order in which the cars were placed into the allocation trains is the same as the order in which they were allocated. This is not necessary. Indeed, it may be preferable to reverse their order. Doing so would take advantage of the fact that most references refer from younger objects to older objects; the reversal would decrease the number of remembered-set entries that must be made for these cars.

By employing the present invention, a collector can reduce garbage residence time when it employs direct allocation. Moreover, employing the present invention's teachings makes the train algorithm more practical for single-generation collectors; whereas the way in which most collectors that employ the train algorithm take advantage of infant mortality is to use a separate generation not managed by that algorithm, the present invention enables a collector to take advantage of infant mortality in the train-managed generation itself. The present invention thus constitutes a significant advance in the art.

What is claimed is:

1. A method for employing a computer system that includes memory to collect garbage in accordance with the train algorithm in at least a generation of a dynamically allocated heap in the memory, the method comprising:
  A) treating a generation of a collected heap in the memory as divided into car sections that belong to trains linked in a front-to-rear order;
  B) collecting the generation in collection increments, in each of which a collection set of at least one car section is collected in accordance with the train algorithm such that cars in trains, which are in front of other trains in the front-to-rear order, are collected before cars in the other trains; and
  C) linking cars in to a train that is linked ahead of at least one other train each of at least some cars into which objects are directly allocated;
  D) objects directly allocated before a predetermined time threshold in an interval between collection increments, are allocated in a set of at least one early-object car, and those directly allocated after the predetermined time threshold in the interval are allocated in a set of at least one different, late-object car; and
  E) the trains into which the at least one early-object car and at least one late-object care are linked are not the same.

2. A method as defined in claim 1 wherein:
  F) each early-object car is placed in a train that contains a car belonging to the next collection set; and
  G) each late-object car is placed in a train that contains no cars belonging to the next collection set.

3. A method as defined in claim 1 wherein:
  F) objects directly allocated before the time threshold since the last collection increment are allocated in the set of at least one early-object car;
  G) objects directly allocated after the time threshold since the last collection increment are allocated in the set of at least one late-object car; and
  H) the method includes increasing the time threshold if the fraction of objects reclaimed from early-object cars is greater than a threshold-increase value and decreasing the time threshold if the fraction of objects reclaimed from early-object cars is less than a threshold-decrease value.

4. A method as defined in claim 3 wherein the threshold-increase value is different from the threshold-decrease value.

5. A method as defined in claim 1 wherein the directly allocated objects are allocated in trains that contain no objects other than directly allocated objects.

6. A method as defined in claim 1 wherein:
  D) the cars that are linked in trains are linked in a front-to-rear order within their respective trains such that trains in front of other trains in the front-to-rear order are collected before those other trains; and
  E) the order in which the at least some cars into which objects are directly allocated are linked into a train is the reverse of the order in which those cars were allocated.

7. A computer system comprising:
  A) processor circuitry operable to execute processor instructions; and
  B) memory circuitry, to which the processor circuitry is responsive, that contains processor instructions readable by the processor circuitry to configure the computer system as a garbage collector that:
    i) treats a generation of a dynamically allocated heap as divided into car sections that belong to trains linked in a front-to-rear order;
    ii) collects the generation in collection increments, in each of which a collection set of at least one car section is collected in accordance with the train algorithm such that cars in trains which are in front of other trains in the front-to-rear order, are collected before cars in the other trains;
    iii) links into a train that is linked ahead of at least one other train each of at least some cars into which objects are directly allocated;
  C) objects directly allocated before a predetermined time threshold in an interval between collection increments are allocated in a set of at least one early-object car, and those directly allocated after the predetermined threshold in the interval are allocated in a set of at least one different, late-object car; and
  D) the trains into which the at least one early-object car and at least one late-object car are linked are not the same.

8. A computer system as defined in claim 7 wherein:
  E) each early-object car is placed in a train that contains a car belonging to the next collection set; and
  F) each late-object car is placed in a train that contains no cars belonging to the next collection set.

9. A computer system as defined in claim 7 wherein:
  E) objects directly allocated before the time threshold since the last collection cycle are allocated in the set of at least one early-object car;
  F) objects directly allocated after the time threshold since the last collection cycle are allocated in the set of at least one late-object car; and
  G) the garbage collector increases the time threshold if the fraction of objects reclaimed from early-object cars is greater than a threshold-increase value and decreasing the time threshold if the fraction of objects reclaimed from early-object cars is less than a threshold-decrease value.

10. A computer system as defined in claim 9 wherein the threshold-increase value is different from the threshold-decrease value.

11. A computer system as defined in claim 7 wherein the directly allocated objects are allocated in trains that contain no objects other than directly allocated objects.

12. A computer system as defined in claim 7 wherein:
  C) the cars that are linked in trains are linked in a front-to-rear order within their respective trains such that trains that are in front of other trains in the front-to-rear order are collected before those other trains; and
  D) the order in which the at least some cars into which objects are directly allocated are linked into a train is the reverse of the order in which those cars were allocated.

13. A storage medium containing instructions readable by a computer including memory to configure the computer to operate as a garbage collector that:
  A) treats a generation of a dynamically allocated heap as divided into car sections that belong to trains linked in a front-to-rear order;
  B) collects the generation in collection increments, in each of which a collection set of at least one car section is collected in accordance with the train algorithm such that cars in trains which are in front of other trains in the front-to-rear order, are collected before cars in the other trains;
  C) links into a train that is linked ahead of at least one other train each of at least some cars into which objects are directly allocated;
  C) objects directly allocated before a predetermined time threshold in an interval between collection increments are allocated in a set of at least one early-object car, and those directly allocated after the predetermined threshold in the interval are allocated in a set of at least one different, late-object car; and D) the trains into which the at least one early-object car and at least one late-object car are linked are not the same.

14. A storage medium as defined in claim 13 wherein:
F) each early-object car is placed in a train that contains a car belonging to the next collection set; and
G) each late-object car is placed in a train that contains no cars belonging to the next collection set.

15. A storage medium as defined in claim 13 wherein:
F) objects directly allocated before the time threshold since the last collection cycle are allocated in the set of at least one early-object car;
G) objects directly allocated after the time threshold since the last collection cycle are allocated in the set of at least one late-object car; and
H) the garbage collector increases the time threshold if the fraction of objects reclaimed from early-object cars is greater than a threshold-increase value and decreasing the time threshold if the fraction of objects reclaimed from early-object cars is less than a threshold-decrease value.

16. A storage medium as defined in claim 15 wherein the threshold-increase value is different from the threshold-decrease value.

17. A storage medium as defined in claim 13 wherein the directly allocated objects are allocated in trains that contain no objects other than directly allocated objects.

18. A storage medium as defined in claim 13 wherein:
D) the cars that are linked in trains are linked in a front-to-rear order within their respective trains such that cars, which are in front of other cars in the front-to-rear order, are collected before the other cars; and
E) the order in which the at least some cars into which objects are directly allocated are linked into a train is the reverse of the order in which those cars were allocated.

19. A computer program product comprising a tangible computer usable medium having computer readable program code thereon representing sequences of instructions that, when executed by a computer system including memory, cause it to operate as a garbage collector that:
A) treats a generation of a dynamically allocated heap as divided into car sections that belong to trains linked in a front-to-rear order;
B) collects the generation in collection increments, in each of which a collection set of at least one car section is collected in accordance with the train algorithm such that cars in trains which are in front of other trains in the front-to-rear order, are collected before cars in the other trains;
C) links into a train that is linked ahead of at least one other train each of at least some cars into which objects are directly allocated;
C) objects directly allocated before a predetermined time threshold in an interval between collection increments are allocated in a set of at least one early-object car, and those directly allocated after the predetermined threshold in the interval are allocated in a set of at least one different, late-object car; and
D) the trains into which the at least one early-object car and at least one late-object car are linked are not the same.

20. A computer program product as defined in claim 19 wherein:
F) each early-object car is placed in a train that contains a car belonging to the next collection set; and
G) each late-object car is placed in a train that contains no cars belonging to the next collection set.

21. A computer program product as defined in claim 19 wherein:
F) objects directly allocated before the time threshold since the last collection cycle are allocated in the set of at least one early-object car;
G) objects directly allocated after the time threshold since the last collection cycle are allocated in the set of at least one late-object car; and
H) the garbage collector increases the time threshold if the fraction of objects reclaimed from early-object cars is greater than a threshold-increase value and decreasing the time threshold if the fraction of objects reclaimed from early-object cars is less than a threshold-decrease value.

22. A computer program product as defined in claim 21 wherein the threshold-increase value is different from the threshold-decrease value.

23. A computer program product as defined in claim 19 wherein the directly allocated objects are allocated in trains that contain no objects other than directly allocated objects.

24. A computer program product as defined in claim 19 wherein:
D) the cars that are linked in trains are linked in a front-to-rear order within their respective trains such that trains that are in front of other trains in the front-to-rear order are collected before those other trains; and
E) the order in which the at least some cars into which objects are directly allocated are linked into a train is the reverse of the order in which those cars were allocated.

25. A garbage collector program operation in the memory of a computer and comprising:
A) means for treating a generation of a collected heap in a computer system's memory as divided in car section that belong to trains linked in front-to-rear order;
B) collecting the generation in collection increments, in each of which a collection set of at least one car section is collected in accordance with the train algorithm such that cars in trains, which are in front of other trains in the front-to-rear order are collected before cars in the other trains;
C) linking into a train that is linked ahead of at least one other train each of at least some cars into which objects are directly allocated;
D) objects directly allocated before a predetermined time threshold in an interval between collection increments are allocated in a set of at least one early-object car, and those directly allocated after the predetermined threshold in the interval are allocated in a set of at least one different, late-object car; and
E) the trains into which the at least one early-object car and at least one late-object car are linked are not the same.

* * * * *